United States Patent
Green

(10) Patent No.: US 10,656,026 B2
(45) Date of Patent: May 19, 2020

(54) TEMPERATURE SENSING CIRCUIT FOR TRANSMITTING DATA ACROSS ISOLATION BARRIER

(71) Applicant: Emerson Climate Technologies, Inc., Sidney, OH (US)

(72) Inventor: Charles E. Green, Fenton, MO (US)

(73) Assignee: Emerson Climate Technologies, Inc., Sidney, OH (US)

(*) Notice: Subject to any disclaimer, the term of this patent is extended or adjusted under 35 U.S.C. 154(b) by 219 days.

(21) Appl. No.: 15/419,349

(22) Filed: Jan. 30, 2017

(65) Prior Publication Data

US 2017/0299444 A1 Oct. 19, 2017

Related U.S. Application Data

(60) Provisional application No. 62/323,588, filed on Apr. 15, 2016.

(51) Int. Cl.
*G01K 7/24* (2006.01)

(52) U.S. Cl.
CPC .......... *G01K 7/24* (2013.01); *G01K 2201/00* (2013.01)

(58) Field of Classification Search
CPC .............................. G01K 7/24; G01K 2201/00
See application file for complete search history.

(56) References Cited

U.S. PATENT DOCUMENTS

| | | |
|---|---|---|
| 4,388,578 A | 6/1983 | Green et al. |
| 4,437,146 A | 3/1984 | Carpenter |
| 4,504,922 A | 3/1985 | Johnson et al. |
| 4,939,473 A | 7/1990 | Eno |
| 5,367,617 A | 11/1994 | Goossen et al. |
| 5,410,360 A | 4/1995 | Montgomery |
| 5,493,101 A | 2/1996 | Innes |
| 5,506,484 A | 4/1996 | Munro et al. |

(Continued)

FOREIGN PATENT DOCUMENTS

| | | |
|---|---|---|
| CN | 1051787 A | 5/1991 |
| CN | 103822334 A | 5/2014 |

(Continued)

OTHER PUBLICATIONS

International Search Report regarding International Application No. PCT/US2017/027691, dated Aug. 18, 2017.

(Continued)

*Primary Examiner* — Natalie Huls
*Assistant Examiner* — Janice M Soto
(74) *Attorney, Agent, or Firm* — Harness, Dickey & Pierce, P.L.C.

(57) ABSTRACT

An isolated temperature sensing system includes a thermistor that measures a temperature of a compressor system. An isolation circuit charges a capacitor, sets an output signal to a first state during charging of the capacitor, discharges the capacitor to the thermistor, and sets the output signal to a second state during discharging of the capacitor to the thermistor. The first state is different than the second state. A control module receives the output signal via an isolation barrier and determines the temperature of the compressor system based on a ratio of: (i) a first period that the output signal is in the first state to (ii) a second period that the output signal is in the second state.

20 Claims, 9 Drawing Sheets

(56) References Cited

U.S. PATENT DOCUMENTS

| | | |
|---|---|---|
| 5,583,420 A | 12/1996 | Rice et al. |
| 5,594,635 A | 1/1997 | Gegner |
| 5,600,233 A | 2/1997 | Warren et al. |
| 5,754,036 A | 5/1998 | Walker |
| 5,801,516 A | 9/1998 | Rice et al. |
| 5,823,004 A | 10/1998 | Polley et al. |
| 5,903,130 A | 5/1999 | Rice et al. |
| 6,018,200 A | 1/2000 | Anderson et al. |
| 6,031,749 A | 2/2000 | Covington et al. |
| 6,115,051 A | 9/2000 | Simons et al. |
| 6,137,253 A | 10/2000 | Galbiati et al. |
| 6,158,887 A | 12/2000 | Simpson |
| 6,169,670 B1 | 1/2001 | Okubo et al. |
| 6,181,587 B1 | 1/2001 | Kuramoto et al. |
| 6,188,203 B1 | 2/2001 | Rice et al. |
| 6,215,287 B1 | 4/2001 | Matsushiro et al. |
| 6,239,523 B1 | 5/2001 | Janicek et al. |
| 6,249,104 B1 | 6/2001 | Janicek |
| 6,281,658 B1 | 8/2001 | Han et al. |
| 6,282,910 B1 | 9/2001 | Helt |
| 6,295,215 B1 | 9/2001 | Faria et al. |
| 6,307,759 B1 | 10/2001 | Inarida et al. |
| 6,309,385 B1 | 10/2001 | Simpson |
| 6,313,602 B1 | 11/2001 | Arefeen et al. |
| 6,384,579 B2 | 5/2002 | Watanabe |
| 6,433,504 B1 | 8/2002 | Branecky |
| 6,437,997 B1 | 8/2002 | Inarida et al. |
| 6,476,663 B1 | 11/2002 | Gauthier et al. |
| 6,483,265 B1 | 11/2002 | Hollenbeck et al. |
| 6,498,451 B1 | 12/2002 | Boules et al. |
| 6,515,437 B1 | 2/2003 | Zinkler et al. |
| 6,556,462 B1 | 4/2003 | Steigerwald et al. |
| 6,586,904 B2 | 7/2003 | McClelland et al. |
| 6,593,881 B2 | 7/2003 | Vail et al. |
| 6,629,776 B2 | 10/2003 | Bell et al. |
| 6,693,407 B2 | 2/2004 | Atmur |
| 6,693,409 B2 | 2/2004 | Lynch et al. |
| 6,710,573 B2 | 3/2004 | Kadah |
| 6,717,457 B2 | 4/2004 | Nanba et al. |
| 6,737,833 B2 | 5/2004 | Kalman et al. |
| 6,781,802 B2 | 8/2004 | Kato et al. |
| 6,801,028 B2 | 10/2004 | Kernahan et al. |
| 6,806,676 B2 | 10/2004 | Papiernik et al. |
| 6,810,292 B1 | 10/2004 | Rappenecker et al. |
| 6,859,008 B1 | 2/2005 | Seibel |
| 6,885,161 B2 | 4/2005 | de Nanclares et al. |
| 6,885,568 B2 | 4/2005 | Kernahan et al. |
| 6,900,607 B2 | 5/2005 | Kleinau et al. |
| 6,902,117 B1 * | 6/2005 | Rosen ............... G05D 23/1905 236/46 R |
| 6,906,500 B2 | 6/2005 | Kernahan |
| 6,906,933 B2 | 6/2005 | Taimela |
| 6,909,266 B2 | 6/2005 | Kernahan et al. |
| 6,930,459 B2 | 8/2005 | Fritsch et al. |
| 6,949,915 B2 | 9/2005 | Stanley |
| 6,952,089 B2 | 10/2005 | Matsuo |
| 6,961,015 B2 | 11/2005 | Kernahan et al. |
| 6,979,967 B2 | 12/2005 | Ho |
| 6,979,987 B2 | 12/2005 | Kernahan et al. |
| 6,984,948 B2 | 1/2006 | Nakata et al. |
| 7,015,679 B2 | 3/2006 | Ryba et al. |
| 7,053,569 B2 | 5/2006 | Takahashi et al. |
| 7,061,195 B2 | 6/2006 | Ho et al. |
| 7,068,016 B2 | 6/2006 | Athari |
| 7,068,191 B2 | 6/2006 | Kuner et al. |
| 7,071,641 B2 | 7/2006 | Arai et al. |
| 7,081,733 B2 | 7/2006 | Han et al. |
| 7,112,940 B2 | 9/2006 | Shimozono et al. |
| 7,135,830 B2 | 11/2006 | El-Ibiary |
| 7,148,664 B2 | 12/2006 | Takahashi et al. |
| 7,149,644 B2 | 12/2006 | Kobayashi et al. |
| 7,154,238 B2 | 12/2006 | Kinukawa et al. |
| 7,164,590 B2 | 1/2007 | Li et al. |
| 7,176,644 B2 | 2/2007 | Ueda et al. |
| 7,180,273 B2 | 2/2007 | Bocchiola et al. |
| 7,181,923 B2 | 2/2007 | Kurita et al. |
| 7,193,383 B2 | 3/2007 | Sarlioglu et al. |
| 7,202,626 B2 | 4/2007 | Jadric et al. |
| 7,208,891 B2 | 4/2007 | Jadric et al. |
| 7,221,121 B2 | 5/2007 | Skaug et al. |
| 7,239,257 B1 | 7/2007 | Alexander et al. |
| 7,256,564 B2 | 8/2007 | MacKay |
| 7,274,241 B2 | 9/2007 | Ho et al. |
| 7,309,977 B2 | 12/2007 | Gray et al. |
| 7,330,011 B2 | 2/2008 | Ueda et al. |
| 7,336,514 B2 | 2/2008 | Amarillas et al. |
| 7,339,346 B2 | 3/2008 | Ta et al. |
| 7,358,706 B2 | 4/2008 | Lys |
| 7,359,224 B2 | 4/2008 | Li |
| 7,425,806 B2 | 9/2008 | Schnetzka et al. |
| 7,459,864 B2 | 12/2008 | Lys |
| 7,463,006 B2 | 12/2008 | Ta et al. |
| 7,495,404 B2 | 2/2009 | Sarlioglu et al. |
| 7,508,688 B2 | 3/2009 | Virolainen |
| 7,532,491 B2 | 5/2009 | Lim et al. |
| 7,573,275 B2 | 8/2009 | Inagaki et al. |
| 7,592,820 B2 | 9/2009 | Laakso et al. |
| 7,598,698 B2 | 10/2009 | Hashimoto et al. |
| 7,612,522 B2 | 11/2009 | Williams et al. |
| 7,613,018 B2 | 11/2009 | Lim et al. |
| 7,616,466 B2 | 11/2009 | Chakrabarti et al. |
| 7,633,249 B2 | 12/2009 | Sekimoto et al. |
| 7,650,760 B2 | 1/2010 | Nakata et al. |
| 7,659,678 B2 | 2/2010 | Maiocchi |
| 7,667,986 B2 | 2/2010 | Artusi et al. |
| 7,671,557 B2 | 3/2010 | Maeda et al. |
| 7,675,759 B2 | 3/2010 | Artusi et al. |
| 7,723,964 B2 | 5/2010 | Taguchi |
| 7,750,595 B2 | 7/2010 | Yamada et al. |
| 7,771,115 B2 | 8/2010 | Pan |
| 7,847,507 B2 | 12/2010 | Wagoner |
| 7,880,430 B2 | 2/2011 | Gale et al. |
| 7,888,922 B2 | 2/2011 | Melanson |
| 7,903,441 B2 | 3/2011 | Chen et al. |
| 7,952,293 B2 | 5/2011 | Kelly |
| 7,966,079 B2 | 6/2011 | Graves |
| 7,966,081 B2 | 6/2011 | Graves |
| 8,032,323 B2 | 10/2011 | Taylor |
| 8,040,703 B2 | 10/2011 | Melanson |
| 8,044,623 B2 | 10/2011 | Takeuchi et al. |
| 8,050,063 B2 | 11/2011 | Wagoner et al. |
| 8,054,033 B2 | 11/2011 | Kern et al. |
| 8,065,023 B2 | 11/2011 | Graves |
| 8,072,170 B2 | 12/2011 | Hwang et al. |
| 8,092,084 B2 | 1/2012 | Riddle et al. |
| 8,096,139 B2 | 1/2012 | Taras et al. |
| 8,120,299 B2 | 2/2012 | Hwang et al. |
| 8,130,522 B2 | 3/2012 | Maksimovic |
| 8,154,230 B2 | 4/2012 | Kimura |
| 8,164,292 B2 | 4/2012 | Park |
| 8,169,180 B2 | 5/2012 | Hwang et al. |
| 8,174,853 B2 | 5/2012 | Kane et al. |
| 8,182,245 B2 | 5/2012 | Maeda et al. |
| 8,193,756 B2 | 6/2012 | Jadric et al. |
| 8,223,508 B2 | 7/2012 | Baarman et al. |
| 8,228,700 B2 | 7/2012 | Yahata et al. |
| 8,264,192 B2 | 9/2012 | Green et al. |
| 8,264,860 B2 | 9/2012 | Green |
| 8,269,370 B2 | 9/2012 | Haga |
| 8,278,778 B2 | 10/2012 | Rockenfeller et al. |
| 8,288,985 B2 | 10/2012 | Takahashi |
| 8,292,503 B2 | 10/2012 | Pan |
| 8,299,653 B2 | 10/2012 | Rockenfeller et al. |
| 8,305,780 B2 | 11/2012 | Saruwatari et al. |
| 8,320,145 B2 | 11/2012 | Horii |
| 8,321,039 B2 | 11/2012 | Graves |
| 8,335,095 B2 | 12/2012 | Mi et al. |
| 8,344,638 B2 | 1/2013 | Shteynberg et al. |
| 8,345,454 B1 | 1/2013 | Krolak et al. |
| 8,358,098 B2 | 1/2013 | Skinner et al. |
| 8,395,874 B2 | 3/2013 | Yamai et al. |
| 8,400,089 B2 | 3/2013 | Bonner et al. |
| 8,406,021 B2 | 3/2013 | Green |
| 8,432,108 B2 | 4/2013 | Kelly et al. |

(56) References Cited

U.S. PATENT DOCUMENTS

| | | | |
|---|---|---|---|
| 8,432,713 B2 | 4/2013 | Popescu et al. |
| 8,467,197 B2 | 6/2013 | Perisic et al. |
| 8,477,514 B2 | 7/2013 | Artusi et al. |
| 8,477,517 B2 | 7/2013 | Joshi |
| 8,487,601 B2 | 7/2013 | Saint-Pierre |
| 8,493,014 B2 | 7/2013 | Henderson et al. |
| 8,508,165 B2 | 8/2013 | Shinomoto et al. |
| 8,508,166 B2 | 8/2013 | Marcinkiewicz et al. |
| 8,520,415 B1 | 8/2013 | Krishnamoorthy et al. |
| 8,520,420 B2 | 8/2013 | Jungreis et al. |
| 8,547,024 B2 | 10/2013 | Grotkowski et al. |
| 8,547,713 B2 | 10/2013 | Kono et al. |
| 8,564,982 B2 | 10/2013 | Song et al. |
| 8,582,263 B2 | 11/2013 | Butler |
| 8,587,962 B2 | 11/2013 | Perisic et al. |
| 8,599,577 B2 | 12/2013 | Kajouke et al. |
| 8,614,562 B2 | 12/2013 | Bouchez et al. |
| 8,633,668 B2 | 1/2014 | Marcoccia |
| 8,638,074 B2 | 1/2014 | Babcock et al. |
| 8,648,558 B2 | 2/2014 | Clothier et al. |
| 8,657,585 B2 | 2/2014 | Hong et al. |
| 8,669,805 B2 | 3/2014 | Serventi et al. |
| 8,693,228 B2 | 4/2014 | Matan et al. |
| 8,698,433 B2 | 4/2014 | Green |
| 8,704,409 B2 | 4/2014 | Owens |
| 8,736,207 B2 | 5/2014 | Ritter et al. |
| 8,749,222 B2 | 6/2014 | Williams |
| 8,751,374 B2 | 6/2014 | Graves |
| 8,760,089 B2 | 6/2014 | Smith |
| 8,760,096 B2 | 6/2014 | Inamura et al. |
| 8,767,418 B2 | 7/2014 | Jungreis et al. |
| 8,773,052 B2 | 7/2014 | Clothier et al. |
| 8,796,967 B2 | 8/2014 | Sato |
| 8,817,506 B2 | 8/2014 | Shimomugi et al. |
| 8,823,292 B2 | 9/2014 | Sumi et al. |
| 8,829,976 B2 | 9/2014 | Kuwabara et al. |
| 8,836,253 B2 | 9/2014 | Kato et al. |
| 8,847,503 B2 | 9/2014 | Chang et al. |
| 8,866,459 B2 | 10/2014 | Zilberberg |
| 8,884,560 B2 | 11/2014 | Ito |
| 8,896,248 B2 | 11/2014 | Becerra et al. |
| 8,928,262 B2 | 1/2015 | Chretien |
| 8,933,654 B2 | 1/2015 | Chen et al. |
| 8,937,821 B2 | 1/2015 | Amano et al. |
| 8,941,347 B2 | 1/2015 | Otorii et al. |
| 8,941,365 B2 | 1/2015 | Murdock et al. |
| 8,976,551 B2 | 3/2015 | Igarashi et al. |
| 9,020,731 B2 | 4/2015 | Yamada |
| 9,030,143 B2 | 5/2015 | Guzelgunler |
| 9,065,365 B2 | 6/2015 | Omata et al. |
| 9,065,367 B2 | 6/2015 | Greetham |
| 9,070,224 B1 | 6/2015 | Esfahbod MirHosseinZadeh Sarabi et al. |
| 9,071,186 B2 | 6/2015 | Wu et al. |
| 9,088,232 B2 | 7/2015 | Marcinkiewicz et al. |
| 9,088,237 B2 | 7/2015 | Sanchez et al. |
| 9,093,941 B2 | 7/2015 | Lawrence et al. |
| 9,100,019 B2 | 8/2015 | Akiyama |
| 9,109,959 B2 | 8/2015 | Nieddu et al. |
| 9,118,260 B2 | 8/2015 | Gautier et al. |
| 9,124,095 B1 | 9/2015 | Barron et al. |
| 9,124,200 B2 | 9/2015 | Dai |
| 9,130,493 B2 | 9/2015 | Chen et al. |
| 9,134,183 B2 | 9/2015 | Jeong et al. |
| 9,136,757 B2 | 9/2015 | Arisawa et al. |
| 9,136,790 B2 | 9/2015 | Park et al. |
| 9,154,061 B2 | 10/2015 | Green et al. |
| 9,185,768 B2 | 11/2015 | Navabi-Shirazi et al. |
| 9,188,491 B2 | 11/2015 | Pan |
| 9,190,926 B2 | 11/2015 | Taguchi |
| 9,197,132 B2 | 11/2015 | Artusi et al. |
| 9,214,881 B2 | 12/2015 | Sekimoto et al. |
| 9,225,258 B2 | 12/2015 | Shimomugi et al. |
| 9,225,284 B2 | 12/2015 | Ried |
| 9,240,739 B2 | 1/2016 | Fukuta et al. |
| 9,246,398 B2 | 1/2016 | Sakakibara et al. |
| 9,246,418 B2 | 1/2016 | Becker et al. |
| 9,247,608 B2 | 1/2016 | Chitta et al. |
| 9,250,299 B1 | 2/2016 | Yarlagadda et al. |
| 9,257,931 B2 | 2/2016 | Tooyama et al. |
| 9,300,241 B2 | 3/2016 | Becerra et al. |
| 9,312,780 B2 | 4/2016 | Taguchi |
| 9,322,717 B1 | 4/2016 | Dhaliwal et al. |
| 9,322,867 B2 | 4/2016 | Chatroux et al. |
| 9,325,517 B2 | 4/2016 | Grohman |
| 9,331,598 B2 | 5/2016 | Jeong et al. |
| 9,331,614 B2 | 5/2016 | Becerra et al. |
| 9,387,800 B2 | 7/2016 | Tran |
| 9,407,093 B2 | 8/2016 | Cummings |
| 9,407,135 B2 | 8/2016 | Kinomura et al. |
| 9,419,513 B2 | 8/2016 | Mao et al. |
| 9,425,610 B2 | 8/2016 | Nakashita et al. |
| 9,431,915 B2 | 8/2016 | Arisawa et al. |
| 9,431,923 B2 | 8/2016 | Harada et al. |
| 9,438,029 B2 | 9/2016 | Cameron |
| 9,444,331 B2 | 9/2016 | Carletti et al. |
| 9,461,577 B2 | 10/2016 | Ried |
| 9,479,070 B2 | 10/2016 | van der Merwe |
| 9,502,981 B2 | 11/2016 | Schaemann et al. |
| 9,504,105 B2 | 11/2016 | Ekbote et al. |
| 9,560,718 B2 | 1/2017 | Sadwick |
| 9,564,846 B2 | 2/2017 | Marcinkiewicz et al. |
| 9,564,848 B2 | 2/2017 | Ishizeki et al. |
| 9,565,731 B2 | 2/2017 | DeJonge |
| 9,577,534 B2 | 2/2017 | Ishizeki et al. |
| 9,580,858 B2 | 2/2017 | Maekawa et al. |
| 9,581,626 B2 | 2/2017 | Schwind |
| 9,595,889 B2 | 3/2017 | Li et al. |
| 9,618,249 B2 | 4/2017 | Hatakeyama et al. |
| 9,621,101 B2 | 4/2017 | Kane |
| 9,625,190 B2 | 4/2017 | Lee et al. |
| 9,634,602 B2 | 4/2017 | Hou et al. |
| 9,640,617 B2 | 5/2017 | Das et al. |
| 9,641,063 B2 | 5/2017 | Ramabhadran et al. |
| 9,641,115 B2 | 5/2017 | Chretien |
| 9,654,048 B2 | 5/2017 | West et al. |
| 9,667,169 B2 | 5/2017 | Nawa et al. |
| 9,683,904 B2 | 6/2017 | Matsumoto et al. |
| 9,692,312 B2 | 6/2017 | Yuasa et al. |
| 9,692,332 B2 | 6/2017 | Taoka et al. |
| 9,696,693 B2 | 7/2017 | Element |
| 9,698,768 B2 | 7/2017 | Leong et al. |
| 9,712,071 B2 | 7/2017 | Yuasa et al. |
| 9,715,913 B1 | 7/2017 | Yin et al. |
| 9,722,488 B2 | 8/2017 | Ishizeki et al. |
| 9,732,991 B2 | 8/2017 | An et al. |
| 9,741,182 B2 | 8/2017 | Zhu |
| 9,742,319 B2 | 8/2017 | Marvelly et al. |
| 9,742,346 B2 | 8/2017 | Esnault |
| 9,746,812 B2 | 8/2017 | Kosaka |
| 9,762,119 B2 | 9/2017 | Kim et al. |
| 9,772,131 B2 | 9/2017 | Hatakeyama et al. |
| 9,772,381 B2 | 9/2017 | Bock et al. |
| 9,780,683 B2 | 10/2017 | Sakakibara et al. |
| 9,787,175 B2 | 10/2017 | Phadke |
| 9,787,246 B2 | 10/2017 | Tsumura et al. |
| 9,791,327 B2 | 10/2017 | Rhee et al. |
| 9,800,138 B2 | 10/2017 | Katsumata |
| 9,813,000 B2 | 11/2017 | Jabusch et al. |
| 9,816,743 B2 | 11/2017 | Nakase et al. |
| 9,819,294 B2 | 11/2017 | Park et al. |
| 9,823,105 B2 | 11/2017 | Lehmkuhl et al. |
| 9,829,226 B2 | 11/2017 | Hatakeyama et al. |
| 9,829,234 B2 | 11/2017 | Hatakeyama et al. |
| 9,837,952 B1 | 12/2017 | Carcia et al. |
| 9,839,103 B2 | 12/2017 | Avrahamy |
| 9,852,559 B2 | 12/2017 | Rettig et al. |
| 9,853,559 B2 | 12/2017 | Taniguchi et al. |
| 9,867,263 B2 | 1/2018 | Avrahamy |
| 9,870,009 B2 | 1/2018 | Erwin et al. |
| 9,882,466 B2 | 1/2018 | Kondo et al. |
| 9,888,535 B2 | 2/2018 | Chitta et al. |
| 9,888,540 B2 | 2/2018 | DeJonge |
| 9,893,522 B2 | 2/2018 | Wallace et al. |

(56) References Cited

U.S. PATENT DOCUMENTS

| | | |
|---|---|---|
| 9,893,603 B2 | 2/2018 | Nishizawa et al. |
| 9,893,668 B2 | 2/2018 | Hart et al. |
| 9,899,916 B2 | 2/2018 | Okamura et al. |
| 9,929,636 B2 | 3/2018 | Shinomoto et al. |
| 9,935,569 B2 | 4/2018 | Tsumura et al. |
| 9,935,571 B2 | 4/2018 | Frampton et al. |
| 9,941,834 B2 | 4/2018 | Tsukano et al. |
| 9,954,473 B2 | 4/2018 | Je et al. |
| 9,954,475 B2 | 4/2018 | Cho et al. |
| 9,965,928 B2 | 5/2018 | Green |
| 9,973,129 B2 | 5/2018 | Schuster et al. |
| 9,998,049 B2 | 6/2018 | Kashima et al. |
| 10,003,277 B2 | 6/2018 | Taguchi et al. |
| 10,014,858 B2 | 7/2018 | Flynn et al. |
| 2002/0085468 A1 | 7/2002 | Kobayashi |
| 2003/0021127 A1 | 1/2003 | Loef et al. |
| 2003/0117818 A1 | 6/2003 | Ota |
| 2003/0218448 A1 | 11/2003 | Lidak et al. |
| 2004/0136208 A1 | 7/2004 | Agarwal et al. |
| 2004/0183513 A1 | 9/2004 | Vinciarelli |
| 2005/0017695 A1 | 1/2005 | Stanley |
| 2005/0017699 A1 | 1/2005 | Stanley |
| 2005/0028539 A1 | 2/2005 | Singh et al. |
| 2005/0068337 A1 | 3/2005 | Duarte et al. |
| 2005/0076659 A1 | 4/2005 | Wallace et al. |
| 2005/0109047 A1 | 5/2005 | Park et al. |
| 2005/0122082 A1 | 6/2005 | Eckardt |
| 2006/0022648 A1 | 2/2006 | Ben-Yaakov et al. |
| 2006/0245219 A1 | 11/2006 | Li |
| 2007/0012052 A1* | 1/2007 | Butler ............ F25B 49/02 62/181 |
| 2007/0036212 A1 | 2/2007 | Leung et al. |
| 2007/0217233 A1 | 9/2007 | Lim et al. |
| 2008/0000246 A1* | 1/2008 | Ha ............ F25B 49/025 62/228.1 |
| 2008/0104983 A1 | 5/2008 | Yamai et al. |
| 2008/0115512 A1 | 5/2008 | Rizzo |
| 2008/0122418 A1 | 5/2008 | Briere et al. |
| 2008/0272748 A1 | 11/2008 | Melanson |
| 2008/0310201 A1 | 12/2008 | Maksimovic |
| 2009/0178424 A1 | 7/2009 | Hwang et al. |
| 2009/0273297 A1 | 11/2009 | Kelly |
| 2010/0067270 A1 | 3/2010 | Odell |
| 2010/0117545 A1 | 5/2010 | Kelly et al. |
| 2010/0253295 A1 | 10/2010 | Tan et al. |
| 2010/0309700 A1 | 12/2010 | Maeda et al. |
| 2011/0012526 A1 | 1/2011 | Kelly |
| 2011/0015788 A1 | 1/2011 | Celik et al. |
| 2011/0030396 A1 | 2/2011 | Marcinkiewicz et al. |
| 2011/0030398 A1 | 2/2011 | Marcinkiewicz et al. |
| 2011/0031911 A1 | 2/2011 | Marcinkiewicz et al. |
| 2011/0031920 A1 | 2/2011 | Henderson et al. |
| 2011/0031942 A1 | 2/2011 | Green |
| 2011/0031943 A1 | 2/2011 | Green |
| 2011/0034176 A1 | 2/2011 | Lord et al. |
| 2011/0141774 A1 | 6/2011 | Kane et al. |
| 2011/0164339 A1 | 7/2011 | Schmid et al. |
| 2011/0204820 A1 | 8/2011 | Tikkanen et al. |
| 2011/0205161 A1 | 8/2011 | Myers et al. |
| 2011/0304279 A1 | 12/2011 | Felty |
| 2012/0013282 A1 | 1/2012 | Introwicz |
| 2012/0075310 A1 | 3/2012 | Michail et al. |
| 2012/0153396 A1 | 6/2012 | Sugiura et al. |
| 2012/0153916 A1 | 6/2012 | Weinstein et al. |
| 2012/0179299 A1 | 7/2012 | Gyota et al. |
| 2012/0280637 A1 | 11/2012 | Tikkanen et al. |
| 2012/0313646 A1 | 12/2012 | Nishikawa |
| 2013/0010508 A1 | 1/2013 | Courtel |
| 2013/0020310 A1 | 1/2013 | Hacham |
| 2013/0170260 A1 | 7/2013 | Kitamura et al. |
| 2013/0182470 A1 | 7/2013 | Chen et al. |
| 2014/0001993 A1 | 1/2014 | Iwata et al. |
| 2014/0015463 A1 | 1/2014 | Merkel et al. |
| 2014/0077770 A1 | 3/2014 | Omoto et al. |
| 2014/0091622 A1 | 4/2014 | Lucas et al. |
| 2014/0169046 A1 | 6/2014 | Chen |
| 2014/0285163 A1 | 9/2014 | Lin et al. |
| 2014/0292212 A1 | 10/2014 | Gray et al. |
| 2015/0043252 A1 | 2/2015 | Kuang |
| 2015/0084563 A1 | 3/2015 | Lucas et al. |
| 2015/0109077 A1* | 4/2015 | Tomimbang ....... H01H 83/20 335/7 |
| 2015/0191133 A1 | 7/2015 | Okamura et al. |
| 2015/0214833 A1 | 7/2015 | Ramabhadran et al. |
| 2015/0219503 A1 | 8/2015 | Yoshida |
| 2015/0229204 A1 | 8/2015 | Mao et al. |
| 2015/0236581 A1 | 8/2015 | Chen et al. |
| 2015/0285691 A1 | 10/2015 | Caffee et al. |
| 2015/0326107 A1 | 11/2015 | Hsiao et al. |
| 2015/0333633 A1 | 11/2015 | Chen et al. |
| 2015/0354870 A1 | 12/2015 | Lee et al. |
| 2015/0365034 A1 | 12/2015 | Marcinkiewicz et al. |
| 2016/0013740 A1 | 1/2016 | Skinner et al. |
| 2016/0043632 A1 | 2/2016 | Tomioka |
| 2016/0043633 A1 | 2/2016 | Phadke |
| 2016/0094039 A1 | 3/2016 | Winstanley et al. |
| 2016/0133411 A1 | 5/2016 | Bock et al. |
| 2016/0218624 A1 | 7/2016 | Ishizeki et al. |
| 2016/0248365 A1 | 8/2016 | Ishizeki et al. |
| 2016/0261217 A1 | 9/2016 | Tang |
| 2016/0263331 A1 | 9/2016 | Nessel et al. |
| 2016/0268839 A1 | 9/2016 | Mouridsen |
| 2016/0268949 A1 | 9/2016 | Benn |
| 2016/0268951 A1 | 9/2016 | Cho et al. |
| 2016/0320249 A1 | 11/2016 | Reiman et al. |
| 2016/0329716 A1 | 11/2016 | Inoue |
| 2017/0141709 A1 | 5/2017 | Fukuda et al. |
| 2017/0141717 A1 | 5/2017 | Winstanley et al. |
| 2017/0155347 A1 | 6/2017 | Park et al. |
| 2017/0190530 A1 | 7/2017 | Seki et al. |
| 2017/0201201 A1 | 7/2017 | Aoki et al. |
| 2017/0205103 A1 | 7/2017 | Newcomb |
| 2017/0214341 A1 | 7/2017 | Matthews et al. |
| 2017/0244325 A1 | 8/2017 | Carralero et al. |
| 2017/0264223 A1 | 9/2017 | Kitano et al. |
| 2017/0287721 A1 | 10/2017 | Wood |
| 2017/0288561 A1 | 10/2017 | Lemberg et al. |
| 2017/0300107 A1 | 10/2017 | Green et al. |
| 2017/0301192 A1 | 10/2017 | Green |
| 2017/0302158 A1 | 10/2017 | Green |
| 2017/0302159 A1 | 10/2017 | Green et al. |
| 2017/0302160 A1 | 10/2017 | Marcinkiewicz et al. |
| 2017/0302161 A1 | 10/2017 | Green |
| 2017/0302162 A1 | 10/2017 | Green |
| 2017/0302165 A1 | 10/2017 | Marcinkiewicz et al. |
| 2017/0302200 A1 | 10/2017 | Marcinkiewicz |
| 2017/0302212 A1 | 10/2017 | Marcinkiewicz et al. |
| 2017/0302214 A1 | 10/2017 | Marcinkiewicz et al. |
| 2017/0317623 A1 | 11/2017 | Taniguchi et al. |
| 2017/0317637 A1 | 11/2017 | VanEyll et al. |
| 2017/0324362 A1 | 11/2017 | Colangelo et al. |
| 2017/0328786 A1 | 11/2017 | Takechi |
| 2017/0373629 A1 | 12/2017 | Shin et al. |
| 2018/0026544 A1 | 1/2018 | Baumann et al. |
| 2018/0034403 A1 | 2/2018 | Kim et al. |
| 2018/0062551 A1 | 3/2018 | Moon et al. |
| 2018/0073934 A1 | 3/2018 | Horng et al. |
| 2018/0076748 A1 | 3/2018 | Yamasaki et al. |
| 2018/0082991 A1 | 3/2018 | Toyoda et al. |
| 2018/0091075 A1 | 3/2018 | Musil |
| 2018/0094512 A1 | 4/2018 | Sadilek et al. |
| 2018/0175752 A1 | 6/2018 | Takeoka et al. |
| 2018/0180490 A1 | 6/2018 | Barbier et al. |
| 2018/0191261 A1 | 7/2018 | Chung et al. |
| 2018/0191288 A1 | 7/2018 | Li et al. |

FOREIGN PATENT DOCUMENTS

| | | |
|---|---|---|
| CN | 105078416 A | 11/2015 |
| EP | 0744816 A2 | 11/1996 |
| EP | 1271067 A1 | 1/2003 |
| EP | 1641113 A1 | 3/2006 |
| JP | H11237427 A | 8/1999 |
| JP | 2006134607 A | 5/2006 |

(56) References Cited

FOREIGN PATENT DOCUMENTS

| | | | |
|---|---|---|---|
| JP | 2010541256 A | 12/2010 | |
| JP | 2011160508 A | 8/2011 | |
| JP | 2015080316 A | 4/2015 | |
| KR | 20040025420 A | 3/2004 | |
| KR | 20130067440 A | 6/2013 | |
| WO | WO-2007035407 A1 * | 3/2007 | ............... G01K 7/16 |
| WO | WO-2010143239 A1 | 12/2010 | |
| WO | WO-2011074972 A1 | 6/2011 | |

OTHER PUBLICATIONS

Written Opinion of the International Searching Authority regarding International Application No. PCT/US2017/027691, dated Aug. 18, 2017.
International Search Report regarding International Application No. PCT/US2017/027744, dated Aug. 18, 2017.
Written Opinion of the International Searching Authority regarding International Application No. PCT/US2017/027744, dated Aug. 18, 2017.
International Search Report regarding International Application No. PCT/US2017/027738, dated Aug. 18, 2017.
Written Opinion of the International Searching Authority regarding International Application No. PCT/US2017/027738, dated Aug. 18, 2017.
Office Action regarding U.S. Appl. No. 15/419,394, dated Sep. 11, 2017.
International Search Report regarding International Application No. PCT/US2017/027726, dated Sep. 12, 2017.
Written Opinion of the International Searching Authority regarding International Application No. PCT/US2017/027726, dated Sep. 12, 2017.
International Search Report regarding International Application No. PCT/US2017/027729, dated Sep. 13, 2017.
Written Opinion of the International Searching Authority regarding International Application No. PCT/US2017/027729, dated Sep. 13, 2017.
Applicant-Initiated Interview Summary regarding U.S. Appl. No. 15/419,394, dated Oct. 30, 2017.
Interview Summary regarding U.S. Appl. No. 15/419,394 dated Jan. 29, 2018.
Office Action regarding U.S. Appl. No. 15/419,464 dated Dec. 29, 2017.
Office Action regarding U.S. Appl. No. 15/419,394, dated Dec. 7, 2017.
Office Action regarding U.S. Appl. No. 15/419,423 dated Jan. 8, 2018.
Office Action regarding U.S. Appl. No. 15/487,201 dated Jan. 9, 2018.
Advisory Action regarding U.S. Appl. No. 15/419,394 dated Mar. 12, 2018.
Applicant-Initiated Interview Summary regarding U.S. Appl. No. 15/487,201 dated Mar. 5, 2018.
Interview Summary regarding U.S. Appl. No. 15/419,423 dated Feb. 21, 2018.
Notice of Allowance regarding U.S. Appl. No. 15/430,978 dated Feb. 22, 2018.
Restriction Requirement regarding U.S. Appl. No. 15/487,226 dated Mar. 12, 2018.
Applicant-Initiated Interview Summary regarding U.S. Appl. No. 15/487,027 dated Jun. 21, 2018.
Applicant-Initiated Interview Summary regarding U.S. Appl. No. 15/487,101 dated Jun. 21, 2018.
Applicant-Initiated Interview Summary regarding U.S. Appl. No. 15/487,201 dated May 30, 2018.
Non-Final Office Action regarding U.S. Appl. No. 15/487,226 dated May 16, 2018.
Notice of Allowance regarding U.S. Appl. No. 15/419,394 dated Jul. 20, 2018.
Notice of Allowance regarding U.S. Appl. No. 15/419,394 dated May 11, 2018.
Notice of Allowance regarding U.S. Appl. No. 15/419,464 dated May 11, 2018.
Notice of Allowance regarding U.S. Appl. No. 15/487,201 dated Jul. 20, 2018.
Restriction Requirement regarding U.S. Appl. No. 15/487,175 dated May 16, 2018.
Final Office Action regarding U.S. Appl. No. 15/487,201 dated Apr. 19, 2018.
Non-Final Office Action regarding U.S. Appl. No. 15/419,423 dated May 14, 2018.
Non-Final Office Action regarding U.S. Appl. No. 15/487,101 dated Apr. 9, 2018.
Restriction Requirement regarding U.S. Appl. No. 15/487,151 dated Apr. 5, 2018.
International Search Report regarding International Application No. PCT/US2017/027710, dated Sep. 20, 2017.
Written Opinion of the International Searching Authority regarding International Application No. PCT/US2017/027710, dated Sep. 20, 2017.
Amit Kumar Sinha et al. "SEPIC Based PFC Converter for PMBLDCM Drive in Air Conditioning System." International Journal of Advanced Computer Research, vol. 3, No. 1, Issue 8. Mar. 2013.
International Search Report regarding International Application No. PCT/US2017/027721, dated Sep. 20, 2017.
Written Opinion of the International Searching Authority regarding International Application No. PCT/US2017/027721, dated Sep. 20, 2017.
International Search Report regarding International Application No. PCT/US2017/027699, dated Sep. 20, 2017.
Written Opinion of the International Searching Authority regarding International Application No. PCT/US2017/027699, dated Sep. 20, 2017.
Applicant-Initiated Interview Summary regarding U.S. Appl. No. 15/487,101 dated Jan. 13, 2019.
EPO Communication regarding Rules 161/162 for related PCT Application No. US2017027691 dated Nov. 23, 2018.
Non-Final Office Action regarding U.S. Appl. No. 15/419,423 dated Jan. 29, 2019.
Non-Final Office Action regarding U.S. Appl. No. 15/487,175 dated Jan. 10, 2019.
Non-Final Office Action regarding U.S. Appl. No. 15/487,226 dated Jan. 7, 2019.
Notice of Allowance regarding U.S. Appl. No. 15/943,660 dated Jan. 25, 2019.
Applicant-Initiated Interview Summary regarding U.S. Appl. No. 15/419,423 dated Aug. 9, 2018.
Applicant-Initiated Interview Summary regarding U.S. Appl. No. 15/419,423 dated Dec. 12, 2018.
Corrected Notice of Allowability regarding U.S. Appl. No. 15/419,394 dated Sep. 10, 2018.
Final Office Action regarding U.S. Appl. No. 15/487,101 dated Nov. 14, 2018.
Non-Final Office Action regarding U.S. Appl. No. 15/419,423 dated Oct. 11, 2018.
Notice of Allowance regarding U.S. Appl. No. 15/419,394 dated Aug. 27, 2018.
Notice of Allowance regarding U.S. Appl. No. 15/419,464 dated Sep. 24, 2018.
Notice of Allowance regarding U.S. Appl. No. 15/487,027 dated Oct. 2, 2018.
Notice of Allowance regarding U.S. Appl. No. 15/487,151 dated Oct. 25, 2018.
Notice of Allowance regarding U.S. Appl. No. 15/487,175 dated Oct. 3, 2018.
U.S. Appl. No. 15/419,394, filed Jan. 30, 2017, Charles E. Green.
U.S. Appl. No. 15/419,464, filed Jan. 30, 2017, Charles E. Green.
U.S. Appl. No. 15/487,027, filed Apr. 13, 2017, Joseph G. Marcinkiewicz.
U.S. Appl. No. 15/487,101, filed Apr. 13, 2017, Joseph G. Marcinkiewicz.
U.S. Appl. No. 15/487,151, filed Apr. 13, 2017, Charles E. Green.

(56) References Cited

OTHER PUBLICATIONS

U.S. Appl. No. 15/943,660, filed Apr. 2, 2018, Charles E. Green.
Applicant-Initiated Interview Summary regarding U.S. Appl. No. 15/419,423 dated Mar. 28, 2019.
Non-Final Office Action regarding U.S. Appl. No. 15/419,423 dated May 23, 2019.
Notice of Allowance regarding U.S. Appl. No. 15/419,394 dated Jan. 11, 2019.
Notice of Allowance regarding U.S. Appl. No. 15/487,101 dated Feb. 1, 2019.
Notice of Allowance regarding U.S. Appl. No. 15/487,151 dated Jan. 9, 2019.
Notice of Allowance regarding U.S. Appl. No. 15/943,660 dated May 22, 2019.
Notice of Allowance regarding U.S. Appl. No. 15/419,464 dated Jan. 25, 2019.
Notice of Allowance regarding U.S. Appl. No. 15/487,027 dated Jan. 25, 2019.
Advisory Action regarding U.S. Appl. No. 15/487,175 dated Oct. 24, 2019.
Advisory Action regarding U.S. Appl. No. 15/419,423 dated Nov. 21, 2019.
Applicant-Initiated Interview Summary regarding U.S. Appl. No. 15/419,423 dated Aug. 1, 2019.
Final Office Action regarding U.S. Appl. No. 15/419,423 dated Aug. 30, 2019.
Final Office Action regarding U.S. Appl. No. 15/487,175 dated Jul. 29, 2019.
Final Office Action regarding U.S. Appl. No. 15/487,226 dated Jul. 9, 2019.
Non-Final Office Action regarding U.S. Appl. No. 16/43,548 dated Sep. 30, 2019.
U.S. Appl. No. 15/419,423, filed Jan. 30, 2017, Charles E. Green.
U.S. Appl. No. 15/487,175, filed Apr. 13, 2017, Joseph G. Marcinkiewicz.
U.S. Appl. No. 15/487,226, filed Apr. 13, 2017, Joseph G. Marcinkiewicz.
U.S. Appl. No. 16/433,548, filed Jun. 6, 2019, Joseph G. Marcinkiewicz.
U.S. Appl. No. 16/595,277, filed Oct. 7, 2019, Charles E. Green.
First Office Action for Chinese Application No. CN201780029917.6 dated Jan. 20, 2020. Translation provided.

\* cited by examiner

TEMPERATURE SENSING CIRCUIT FOR TRANSMITTING DATA ACROSS ISOLATION BARRIER

CROSS-REFERENCE TO RELATED APPLICATIONS

This application claims the benefit of U.S. Provisional Application No. 62/323,588, filed on Apr. 15, 2016. The entire disclosure of the application referenced above is incorporated herein by reference.

FIELD

The present disclosure relates to a temperature sensing circuit, and more particularly, to temperature sensing across an isolation barrier.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electric motors are used in a wide variety of industrial and residential applications including, but not limited to, heating, ventilating, and air conditioning (HVAC) systems. For example only, an electric motor may drive a compressor in an HVAC system. One or more additional electric motors may also be implemented in the HVAC system. For example only, the HVAC system may include another electric motor that drives a fan associated with a condenser. Another electric motor may be included in the HVAC system to drive a fan associated with an evaporator.

SUMMARY

In a feature, an isolated temperature sensing system is described. A thermistor measures a temperature of a compressor system. An isolation circuit charges a capacitor, sets an output signal to a first state during charging of the capacitor, discharges the capacitor to the thermistor, and sets the output signal to a second state during discharging of the capacitor to the thermistor. The first state is different than the second state. A control module receives the output signal via an isolation barrier and determines the temperature of the compressor system based on a ratio of: (i) a first period that the output signal is in the first state to (ii) a second period that the output signal is in the second state.

In further features, the temperature of the compressor system includes a discharge line temperature (DLT) of a compressor.

In further features, wherein the isolation barrier includes an optocoupler.

In further features, the isolation circuit charges the capacitor via a resistor and discharges the capacitor to the thermistor and at least one discharge circuit component.

In further features, the control module determines the temperature of the compressor system further based on a first resistance of the resistor and a second resistance of the at least one discharge circuit component.

In further features, the control module determines the temperature of the compressor system as a function of a duty cycle of the output signal.

In further features, the control module determines the temperature of the compressor system based on a duty cycle of the output signal using a look-up table that relates duty cycles to temperatures.

In further features, the control module determines a resistance of the thermistor based on the ratio and determines the temperature of the compressor system based on the resistance of the thermistor.

In further features, the isolation circuit transitions from charging the capacitor to discharging the capacitor when a voltage of the capacitor is greater than a first voltage.

In further features, the isolation circuit transitions from discharging the capacitor to charging the capacitor when the voltage of the capacitor is less than a second voltage. The second voltage is less than the first voltage.

In a feature, an isolated temperature sensing method includes: by a thermistor, measuring a temperature of a compressor system; by an isolation circuit, charging a capacitor, setting an output signal to a first state during charging of the capacitor, discharging the capacitor to the thermistor, and that setting the output signal to a second state during discharging of the capacitor to the thermistor, where the first state is different than the second state; and receiving the output signal via an isolation barrier; determining the temperature of the compressor system based on a ratio of: (i) a first period that the output signal is in the first state to (ii) a second period that the output signal is in the second state.

In further features, the temperature of the compressor system includes a discharge line temperature (DLT) of a compressor.

In further features, the isolation barrier includes an optocoupler.

In further features: charging includes charging the capacitor via a resistor; and discharging includes discharging the capacitor to the thermistor and at least one discharge circuit component.

In further features, determining the temperature of the compressor system includes determining the temperature of the compressor system further based on a first resistance of the resistor and a second resistance of the at least one discharge circuit component.

In further features, determining the temperature of the compressor system includes determining the temperature of the compressor system as a function of a duty cycle of the output signal.

In further features, determining the temperature of the compressor system includes determining the temperature of the compressor system based on a duty cycle of the output signal using a look-up table that relates duty cycles to temperatures.

In further features, the isolated temperature sensing method further includes determining a resistance of the thermistor based on the ratio, and determining the temperature of the compressor system includes determining the temperature of the compressor system based on the resistance of the thermistor.

In further features, the isolated temperature sensing method further includes transitioning from charging the capacitor to discharging the capacitor when a voltage of the capacitor is greater than a first voltage.

In further features, the isolated temperature sensing method further includes transitioning from discharging the capacitor to charging the capacitor when the voltage of the capacitor is less than a second voltage. The second voltage is less than the first voltage.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Refrigeration System

Figure 1:
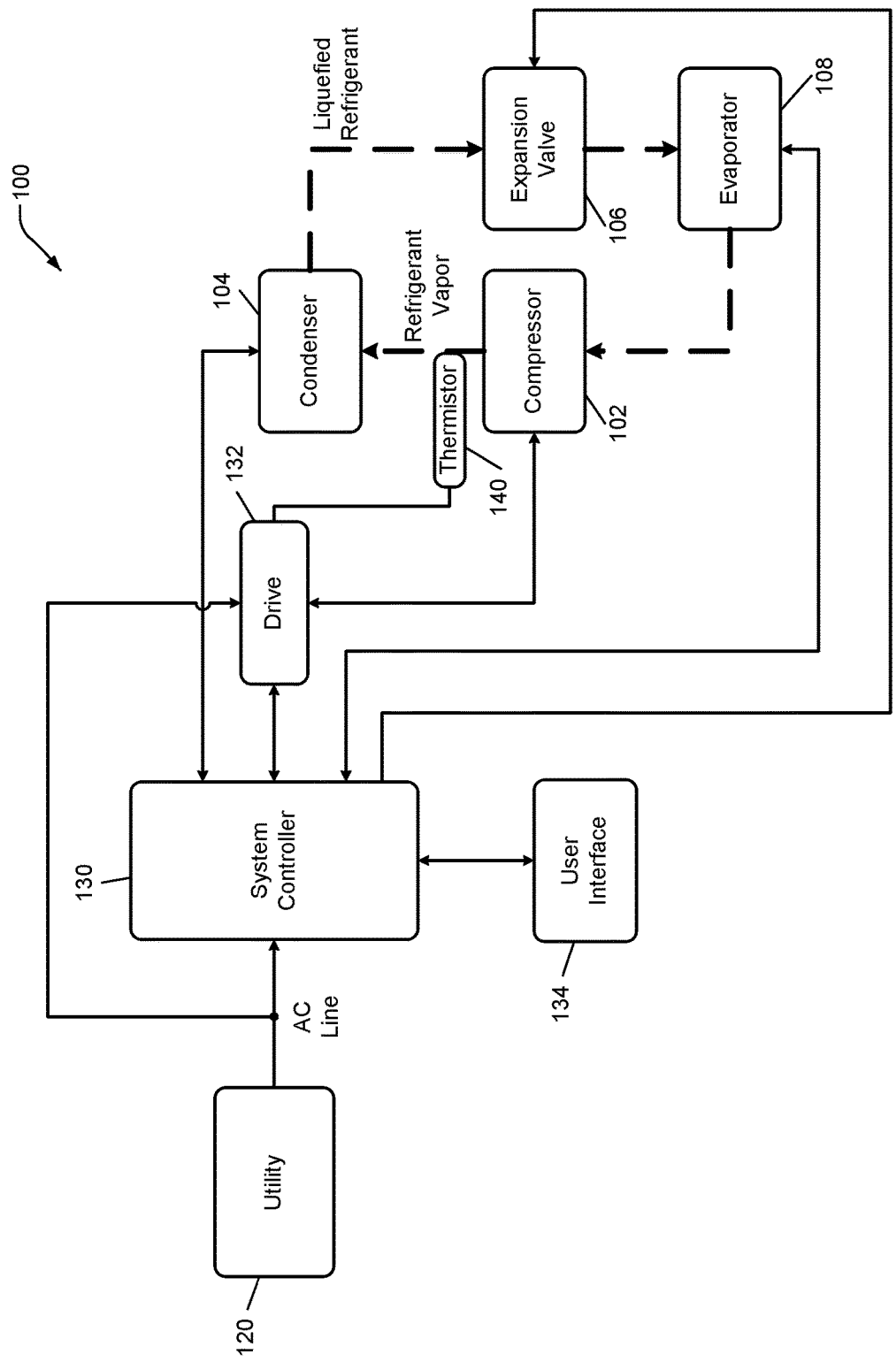
FIG. 1 is a functional block diagram of an example refrigeration system.

FIG. 1 is a functional block diagram of an example refrigeration system 100 including a compressor 102, a condenser 104, an expansion valve 106, and an evaporator 108. According to the principles of the present disclosure, the refrigeration system 100 may include additional and/or alternative components, such as a reversing valve or a filter-drier. In addition, the present disclosure is applicable to other types of refrigeration systems including, but not limited to, heating, ventilating, and air conditioning (HVAC), heat pump, refrigeration, and chiller systems.

The compressor 102 receives refrigerant in vapor form and compresses the refrigerant. The compressor 102 provides pressurized refrigerant in vapor form to the condenser 104. The compressor 102 includes an electric motor that drives a pump. For example only, the pump of the compressor 102 may include a scroll compressor and/or a reciprocating compressor.

All or a portion of the pressurized refrigerant is converted into liquid form within the condenser 104. The condenser 104 transfers heat away from the refrigerant, thereby cooling the refrigerant. When the refrigerant vapor is cooled to a temperature that is less than a saturation temperature, the refrigerant transforms into a liquid (or liquefied) refrigerant. The condenser 104 may include an electric fan that increases the rate of heat transfer away from the refrigerant.

The condenser 104 provides the refrigerant to the evaporator 108 via the expansion valve 106. The expansion valve 106 controls the flow rate at which the refrigerant is supplied to the evaporator 108. The expansion valve 106 may include a thermostatic expansion valve or may be controlled electronically by, for example, a system controller 130. A pressure drop caused by the expansion valve 106 may cause a portion of the liquefied refrigerant to transform back into the vapor form. In this manner, the evaporator 108 may receive a mixture of refrigerant vapor and liquefied refrigerant.

The refrigerant absorbs heat in the evaporator 108. Liquid refrigerant transitions into vapor form when warmed to a temperature that is greater than the saturation temperature of the refrigerant. The evaporator 108 may include an electric fan that increases the rate of heat transfer to the refrigerant.

A utility 120 provides power to the refrigeration system 100. For example only, the utility 120 may provide single-phase alternating current (AC) power at approximately 230 Volts root mean squared ($V_{RMS}$). In other implementations, the utility 120 may provide three-phase AC power at approximately 400 $V_{RMS}$, 480 $V_{RMS}$, or 600 $V_{RMS}$ at a line frequency of, for example, 50 or 60 Hz. When the three-phase AC power is nominally 600 $V_{RMS}$, the actual available voltage of the power may be 575 $V_{RMS}$.

The utility 120 may provide the AC power to the system controller 130 via an AC line, which includes two or more conductors. The AC power may also be provided to a drive 132 via the AC line. The system controller 130 controls the refrigeration system 100. For example only, the system controller 130 may control the refrigeration system 100 based on user inputs and/or parameters measured by various sensors (not shown). The sensors may include pressure sensors, temperature sensors, current sensors, voltage sensors, etc. The sensors may also include feedback information from the drive control, such as motor currents or torque, over a serial data bus or other suitable data buses.

A user interface 134 provides user inputs to the system controller 130. The user interface 134 may additionally or alternatively provide the user inputs directly to the drive 132. The user inputs may include, for example, a desired temperature, requests regarding operation of a fan (e.g., a request for continuous operation of the evaporator fan), and/or other suitable inputs. The user interface 134 may take the form of a thermostat, and some or all functions of the system controller (including, for example, actuating a heat source) may be incorporated into the thermostat.

The system controller 130 may control operation of the fan of the condenser 104, the fan of the evaporator 108, and the expansion valve 106. The drive 132 may control the compressor 102 based on commands from the system controller 130. For example only, the system controller 130 may instruct the drive 132 to operate the motor of the compressor 102 at a certain speed or to operate the compressor 102 at a certain capacity. In various implementations, the drive 132 may also control the condenser fan.

A thermistor 140 is thermally coupled to the refrigerant line exiting the compressor 102 that conveys refrigerant vapor to the condenser 104. The variable resistance of the thermistor 140 therefore varies with the discharge line temperature (DLT) of the compressor 102. As described in more detail, the drive 132 monitors the resistance of the thermistor 140 to determine the temperature of the refrigerant exiting the compressor 102.

The DLT may be used to control the compressor 102, such as by varying capacity of the compressor 102, and may also be used to detect a fault. For example, if the DLT exceeds the threshold, the drive 132 may power down the compressor 102 to prevent damage to the compressor 102.

Drive

Figure 2:
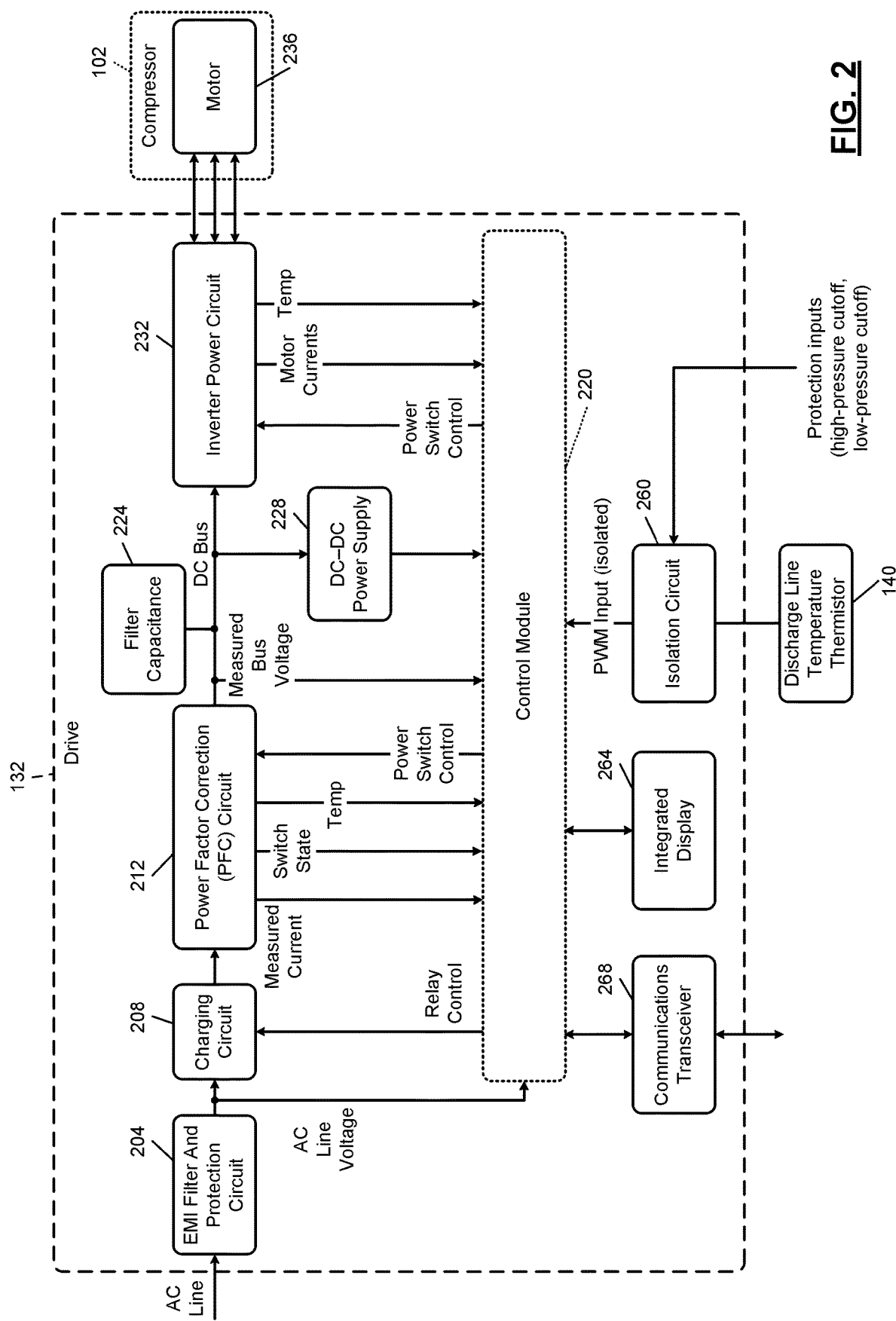
FIG. 2 is a block diagram of an example implementation of the compressor motor drive of FIG. 1.

In FIG. 2, an example implementation of the drive 132 includes an electromagnetic interference (EMI) filter and protection circuit 204, which receives power from an AC line. The EMI filter and protection circuit 204 reduces EMI that might otherwise be injected back onto the AC line from the drive 132. The EMI filter and protection circuit 204 may also remove or reduce EMI arriving from the AC line. Further, the EMI filter and protection circuit 204 protects against power surges, such as may be caused by lightening, and/or other other types of power surges and sags.

A charging circuit 208 controls power supplied from the EMI filter and protection circuit 204 to a power factor correction (PFC) circuit 212. For example, when the drive 132 initially powers up, the charging circuit 208 may place a resistance in series between the EMI filter and protection circuit 204 and the PFC circuit 212 to reduce the amount of current inrush. These current or power spikes may cause various components to prematurely fail.

After initial charging is completed, the charging circuit 208 may close a relay that bypasses the current-limiting resistor. For example, a control module 220 may provide a relay control signal to the relay within the charging circuit 208. In various implementations, the control module 220 may assert the relay control signal to bypass the current-limiting resistor after a predetermined period of time following start up, or based on closed loop feedback indicating that charging is near completion.

The PFC circuit 212 converts incoming AC power to DC power. The PFC circuit 212 may not be limited to PFC functionality—for example, the PFC circuit 212 may also perform voltage conversion functions, such as acting as a boost circuit and/or a buck circuit. In some implementations, the PFC circuit 212 may be replaced by a non-PFC voltage converter. The DC power may have voltage ripples, which are reduced by filter capacitance 224. Filter capacitance 224 may include one or more capacitors arranged in parallel and connected to the DC bus. The PFC circuit 212 may attempt to draw current from the AC line in a sinusoidal pattern that matches the sinusoidal pattern of the incoming voltage. As the sinusoids align, the power factor approaches one, which represents the greatest efficiency and the least demanding load on the AC line.

The PFC circuit 212 includes one or more switches that are controlled by the control module 220 using one or more signals labeled as power switch control. The control module 220 determines the power switch control signals based on a measured voltage of the DC bus, measured current in the PFC circuit 212, AC line voltages, temperature or temperatures of the PFC circuit 212, and the measured state of a power switch in the PFC circuit 212. While the example of use of measured values is provided, the control module 220 may determine the power switch control signals based on an estimated voltage of the DC bus, estimated current in the PFC circuit 212, estimated AC line voltages, estimated temperature or temperatures of the PFC circuit 212, and/or the estimated or expected state of a power switch in the PFC circuit 212. In various implementations, the AC line voltages are measured or estimated subsequent to the EMI filter and protection circuit 204 but prior to the charging circuit 208.

The control module 220 is powered by a DC-DC power supply 228, which provides a voltage suitable for logic of the control module 220, such as 3.3 Volts, 2.5 Volts, etc. The DC-DC power supply 228 may also provide DC power for operating switches of the PFC circuit 212 and an inverter power circuit 232. For example only, this voltage may be a higher voltage than for digital logic, with 15 Volts being one example.

The inverter power circuit 232 also receives power switch control signals from the control module 220. In response to the power switch control signals, switches within the inverter power circuit 232 cause current to flow in respective windings of a motor 236 of the compressor 102. The control module 220 may receive a measurement or estimate of motor current for each winding of the motor 236 or each leg of the inverter power circuit 232. The control module 220 may also receive a temperature indication from the inverter power circuit 232.

For example only, the temperature received from the inverter power circuit 232 and the temperature received from the PFC circuit 212 are used only for fault purposes. In other words, once the temperature exceeds a predetermined threshold, a fault is declared and the drive 132 is either powered down or operated at a reduced capacity. For example, the drive 132 may be operated at a reduced capacity and if the temperature does not decrease at a predetermined rate, the drive 132 transitions to a shutdown state.

The control module 220 may also receive an indication of the discharge line temperature from the compressor 102 using the thermistor 140. An isolation circuit 260 may provide a pulse-width-modulated representation of the resistance of the thermistor 140 to the control module 220. The isolation circuit 260 may include galvanic isolation so that there is no electrical connection between the thermistor 140 and the control module 220.

The isolation circuit 260 may further receive protection inputs indicating faults, such as a high-pressure cutoff or a low-pressure cutoff, where pressure refers to refrigerant pressure. If any of the protection inputs indicate a fault and, in some implementations, if any of the protection inputs become disconnected from the isolation circuit 260, the isolation circuit 260 ceases sending the PWM temperature signal to the control module 220. Therefore, the control module 220 may infer that a protection input has been received from an absence of the PWM signal. The control module 220 may, in response, shut down the drive 132.

The control module 220 controls an integrated display 264, which may include a grid of LEDs and/or a single LED package, which may be a tri-color LED. The control module 220 can provide status information, such as firmware versions, as well as error information using the integrated display 264. The control module 220 communicates with external devices, such as the system controller 130 in FIG. 1, using a communications transceiver 268. For example only, the communications transceiver 268 may conform to the RS-485 or RS-232 serial bus standards or to the Controller Area Network (CAN) bus standard.

PFC Circuits

Figures 3A, 3B:
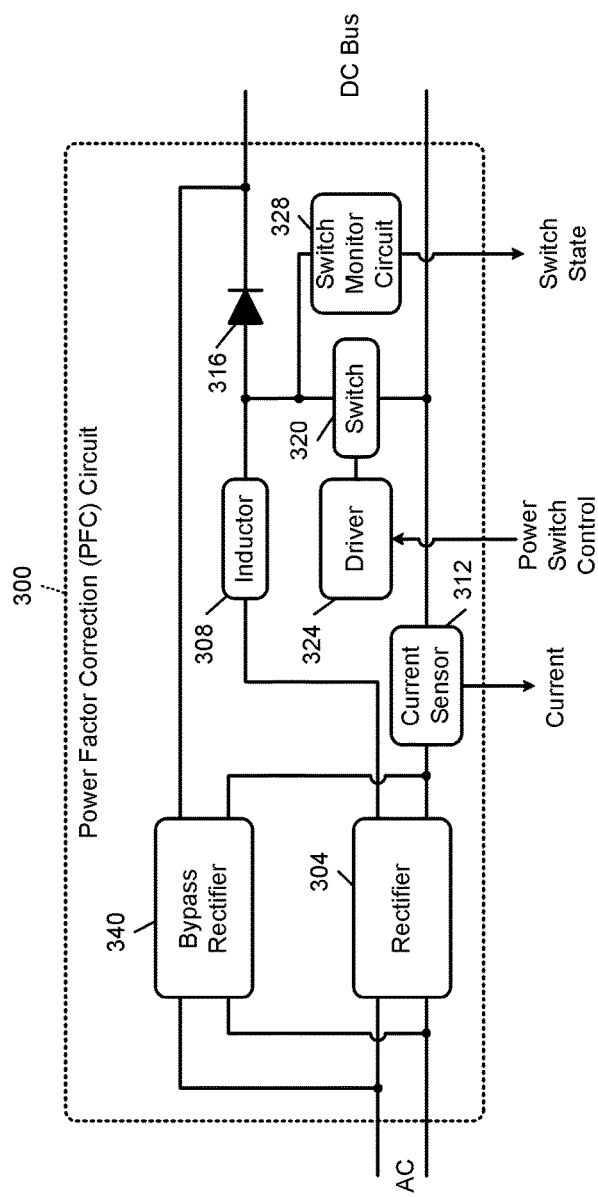
FIG. 3A is a block diagram of an example implementation of the power factor correction (PFC) circuit of FIG. 2.
FIG. 3B is a block diagram of another example implementation of the PFC circuit of FIG. 2.

In FIG. 3A, a PFC circuit 300 is one implementation of the PFC circuit 212 of FIG. 2. The PFC circuit 300 includes a rectifier 304 that converts incoming AC into pulsating DC. In various implementations, the rectifier 304 includes a full-wave diode bridge. The DC output of the rectifier 304 is across first and second terminals. The first terminal is connected to an inductor 308, while the second terminal is connected to a current sensor 312. An opposite end of the inductor 308 is connected to a node that is common to the inductor 308, an anode of a diode 316, and a first terminal of a switch 320.

The PFC circuit 300 generates a DC bus, where a first terminal of the DC bus is connected to a cathode of the diode 316 while a second terminal of the DC bus is connected to the second output terminal of the rectifier 304 via the current sensor 312. The current sensor 312 can, therefore, sense the current within the switch 320 as well as the current in the DC bus and current in the inductor 308. The second terminal of the DC bus is also connected to a second terminal of the switch 320.

A driver 324 receives the power switch control signal from the control module 220 of FIG. 2 and rapidly charges or discharges a control terminal of the switch 320. For example, the switch 320 may be a field effect transistor with a gate terminal as the control terminal. More specifically, the switch 320 may be a power metal-oxide-semiconductor field-effect transistor (MOSFET), such as the STW38N65M5 power MOSFET from STMicroelectronics. The driver 324, in response to the power switch control signal, charges or discharges the capacitance at the gate of the field effect transistor.

A switch monitor circuit 328 measures whether the switch is on or off. This closed loop control enables the control module 220 to determine whether the switch 320 has reacted to a command provided by the power switch control signal and may also be used to determine how long it takes the switch 320 to respond to that control signal. The measured switch state is output from the switch monitor circuit 328 back to the control module 220. The control module 220 may update its control of the power switch control signal to compensate for delays in turning on and/or turning off the switch 320.

In FIG. 3A, the inductor, the switch 320, and the diode 316 are arranged in a boost configuration. In brief, the switch 320 closes, causing current through the inductor 308 to increase. Then the switch 320 is opened, but the current through the inductor 308 cannot change instantaneously because the voltage across an inductor is proportional to the derivative of the current. The voltage across the inductor 308 becomes negative, meaning that the end of the inductor 308 connected to the anode of the diode 316 experiences a voltage increase above the voltage output from the rectifier 304.

Once the voltage at the anode of the diode 316 increases above the turn-on voltage of the diode 316, the current through the inductor 308 can be fed through the diode 316 to the DC bus. The current through the inductor 308 decreases and then the switch 320 is closed once more, causing the current and the inductor 308 to increase.

In various implementations, the switch 320 may be turned on until the current sensor 312 determines that a predetermined threshold of current has been exceeded. At that time, the switch 320 is turned off for a specified period of time. This specified period may be adaptive, changing along with the voltage of the DC bus as well as the voltage of the AC input change. However, the off time (when the switch 320 is open) is a specified value. Once a time equal to the specified value has elapsed, the switch 320 is turned back on again and the process repeats. The off time can be fixed or variable. In the case of the off time being variable, the off time can be limited to at least a predetermined minimum off time.

To reduce the physical size and parts cost of the PFC circuit 300, the inductance of the inductor 308 (which may be the largest contributor to the physical size of the PFC circuit 300) may be lowered. However, with a lower inductance, the inductor 308 will saturate more quickly. Therefore, the switch 320 will have to operate more quickly. While more quickly and smaller are relative terms, present power switching control operates in the range of 10 kilohertz to 20 kilohertz switching frequencies. In the present application, the switching frequency of the switch 320 may be increased to more than 50 kilohertz, more than 100 kilohertz, or more than 200 kilohertz. For example, the switching frequency of the switch may be controlled to be approximately 200 kilohertz.

The switch 320 is therefore chosen to allow for faster switching as well as to have low switching losses. With faster switching, the inductance of the inductor 308 can be smaller. In addition, the diode 316 may need to be faster. Silicon carbide diodes may have fast response times. For example, the diode 316 may be an STPSC2006CW Silicon Carbide dual diode package from STMicroelectronics.

In order to accurately drive the switch 320 when operating at higher speeds, the control strategy must similarly be accelerated. For example only, the control module 220 may include multiple devices, such as a microcontroller configured to perform more involved calculations and an FPGA (field programmable gate array) or PLD (programmable logic device) configured to monitor and respond to inputs in near real time. In this context, near real time means that the time resolution of measurement and time delay in responding to inputs of the FPGA or PLD is negligible compared to the physical time scale of interest. For faster switching speeds, the near real time response of the FPGA/PLD may introduce non-negligible delays. In such cases, the delay of the FPGA/PLD and driving circuitry may be measured and compensated for. For example, if the turn-off of a switch occurs later than needed because of a delay, the turn-off can be instructed earlier to compensate for the delay.

A bypass rectifier 340 is connected in parallel with the rectifier 304 at the AC line input. A second output terminal of the bypass rectifier 340 is connected to the second terminal rectifier 304. However, a first output terminal of the bypass rectifier 340 is connected to the cathode of the diode 316.

As a result, when the PFC circuit 300 is not operating to boost the DC bus voltage, the bypass rectifier 340 will be active when the line-to-line voltage of the AC input exceeds the voltage across the DC bus. The bypass rectifier 340, in these situations, diverts current from passing through the diode 316. Because the inductor 308 is small, and the switch 320 switches rapidly, the diode 316 is also selected to exhibit fast switching times. The diode 316 may, therefore, be less tolerant to high currents, and so current is selectively shunted around the diode 316 by the bypass rectifier 340.

In addition, the current path through the rectifier 304 and the diode 316 experiences three diode voltage drops or two diode voltage drops and the switch voltage drop, while the path through the bypass rectifier 340 experiences only two diode voltage drops. While the single phase AC input in FIG. 3A is associated with a boost converter topology, the present disclosure also encompasses a buck converter topology or a buck-boost converter topology.

In FIG. 3B, a buck converter topology is shown with a three-phase AC input signal. Note that the principles of the present disclosure also apply to a boost converter or buck-boost converter topology used with a three-phase AC input. A PFC circuit 350 represents another implementation of the PFC circuit 212 of FIG. 2.

A three-phase rectifier 354 receives three-phase AC and generates pulsating DC across first and second terminals. A switch 358 is connected between the first terminal of the three-phase rectifier 354 and a common node. The common node is connected to an inductor 366 and a cathode of a power diode 370.

An anode of the power diode 370 is connected to a second terminal of the three-phase rectifier 354. An opposite terminal of the inductor 366 establishes one terminal of the DC bus, while the second output of the three-phase rectifier 354 establishes the other terminal of the DC bus. In the configuration shown in FIG. 3B, the switch 358, the inductor 366, and the diode 370 are configured in a buck topology.

A current sensor 362 is connected in series between the anode of the diode 370 and the DC bus. In other implementations, the current sensor 362 may be located in series with the inductor 366. In other implementations, the current sensor 362 may be located in series with the switch 358. In other implementations, the current sensor 362 may be located in series between the anode of the diode 370 and the second output of the three-phase rectifier 354. The current sensor 362 measures current through the inductor 366 as well as current through the DC bus and provides a current signal indicative of the amount of the current.

A driver 374 drives a control terminal of the switch 358 based on a power switch control signal from the control module 220 in FIG. 2. A switch monitor circuit 378 detects whether the switch 358 has opened or closed and reports the switch state to the control module 220. With the location of the current sensor 362, the current sensor 362 will measure approximately zero current when the switch 358 is open.

The isolation circuit 260 of the present disclosure charges a capacitor via a pull-up resistor and discharges the capacitor via the thermistor 140. The isolation circuit 260 charges the capacitor to a first predetermined value, then discharges the capacitor to a second predetermined value, then charges the capacitor to the first predetermined value, and so on.

Using an optocoupler 402 or another type of isolation barrier, the isolation circuit 260 transmits a pulse width modulation (PWM) signal to the control module 220. Optocouplers can also be referred to as opto-isolators. The state of the PWM signal indicates whether the capacitor is charging or discharging. Based on the PWM signal, the control module determines a charging period of the capacitor and a discharge period of the capacitor. The charging period of the capacitor corresponds to the period to charge the capacitor up to the first predetermined value. The discharge period corresponds to the period to discharge the capacitor down to the second predetermined value.

A ratio of the charge period to the discharge period is approximately equal to or equal to a ratio of the resistance of the pull-up resistor to the combined resistance of the thermistor 140 and other discharge circuit components. A duty cycle of the PWM signal corresponds to the ratio of the charging period of the capacitor to the discharge period of the capacitor. Based on the equivalence of these two ratios and knowledge of the resistance of the other discharge circuit components, the control module determines a resistance of the thermistor 140.

The resistance of the thermistor 140 is directly related to temperature measured by the thermistor 140, such as compressor discharge line temperature (DLT). For the example of the thermistor 140 being a negative temperature coefficient (NTC) thermistor, the resistance of the thermistor 140 may decrease as the temperature of the thermistor 140 increases, and vice versa. While the example of a NTC thermistor will be described, the present application is also applicable to a positive temperature coefficient (PTC) thermistor where resistance decreases as temperature decreases, and vice versa. Also, while the example of a thermistor is described, the present application is also applicable to other types of variable resistance sensors (e.g., pressure sensors). The control module 220 determines the temperature measured by the thermistor 140, for example, based on the duty cycle of the PWM signal (the ratio of the charge period to the discharge period). The temperature measured by the thermistor 140 can therefore be sensed across the isolation barrier provided by the optocoupler.

Figure 4:
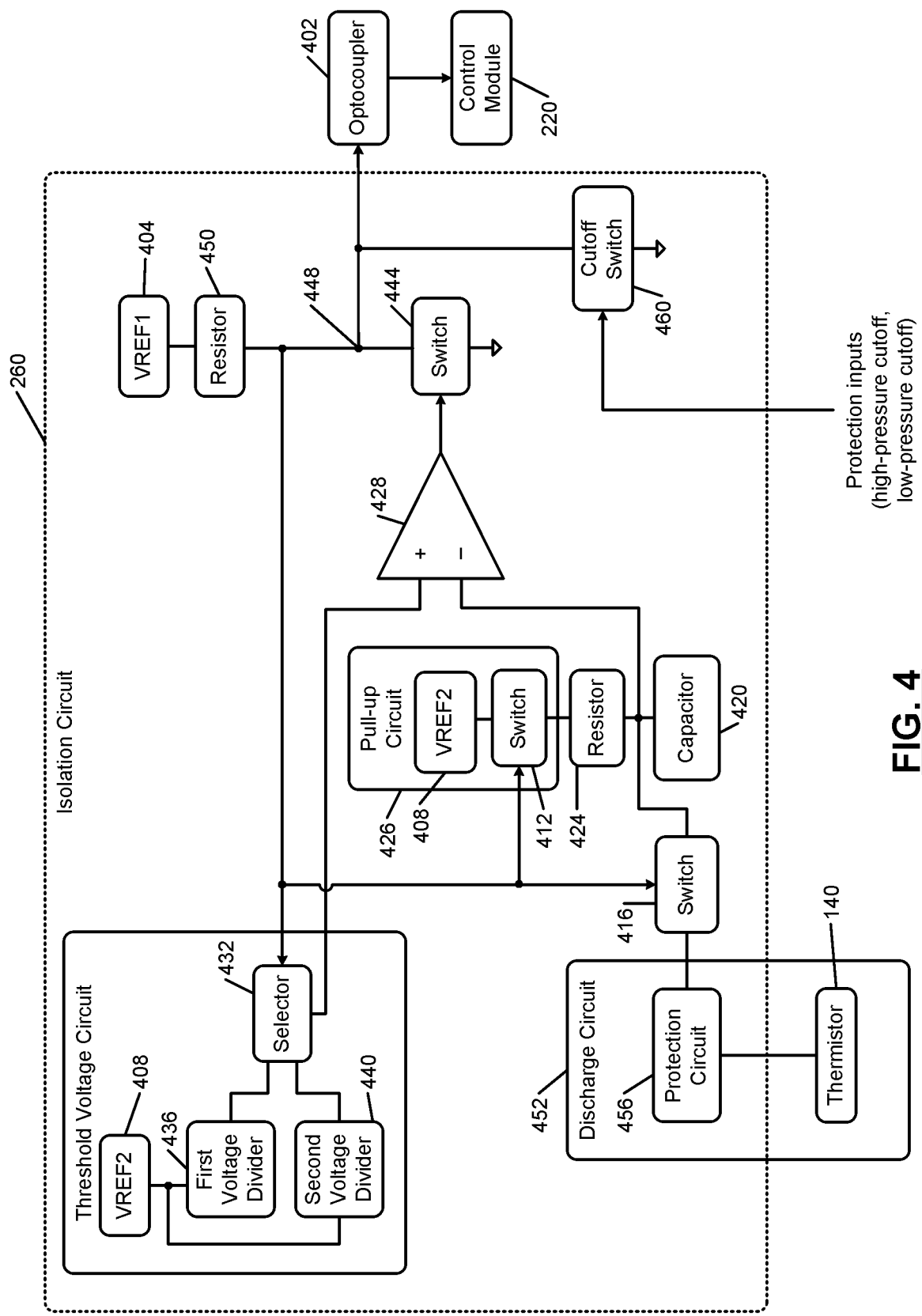
FIG. 4 is a functional block diagram of an example implementation of the isolation circuit.
Figure 5:
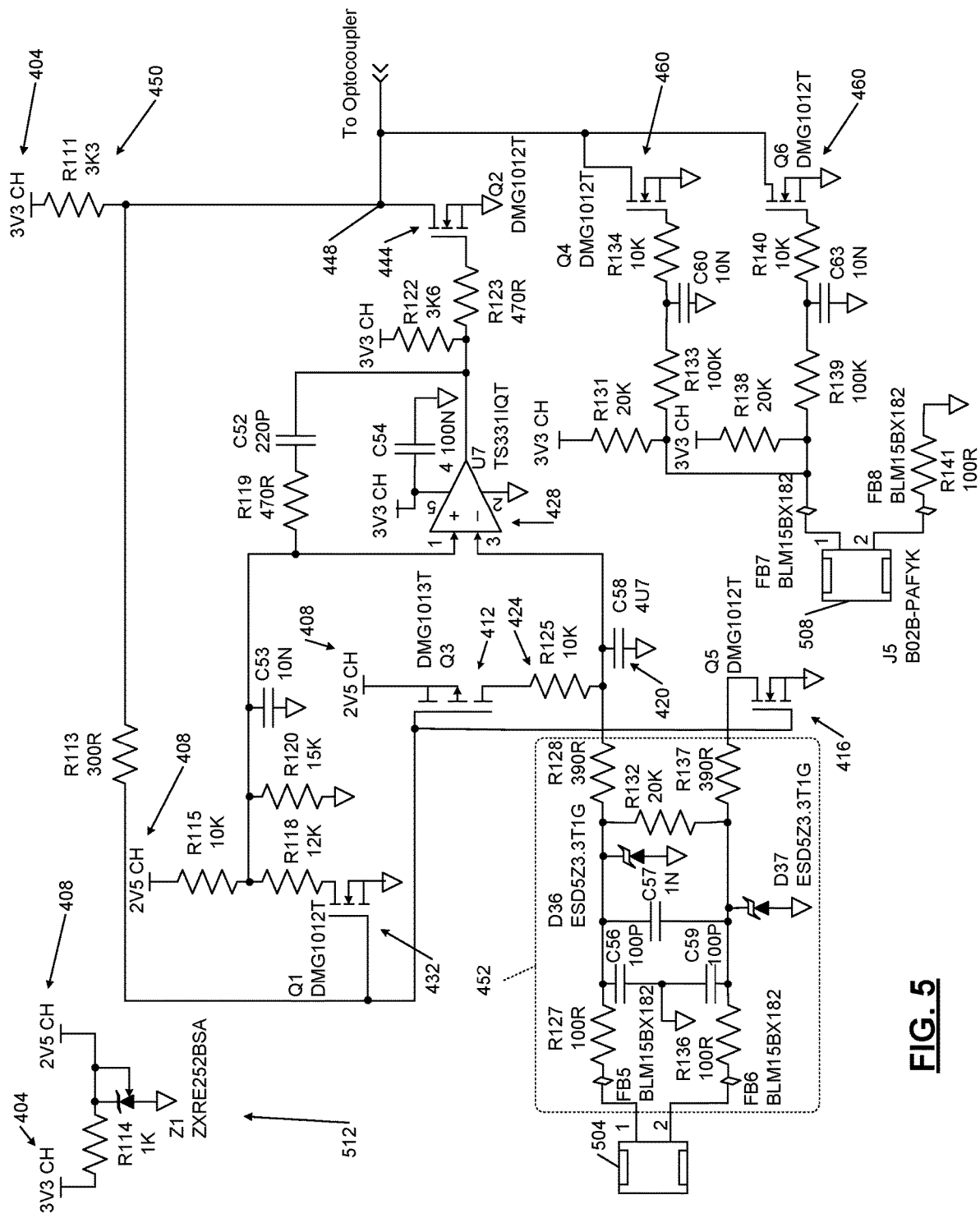
FIG. 5 is a circuit diagram of an example implementation of the isolation circuit.

FIG. 4 is a functional block diagram of an example implementation of the isolation circuit 260. FIG. 5 is a circuit diagram of an example implementation of the isolation circuit 260. The isolation circuit 260 utilizes a first reference voltage (VREF1) 404 and a second reference voltage (VREF2) 408. The first reference voltage 404 may be greater than the second reference voltage 408. For example, the first reference voltage 404 may be approximately 3.3 V, and the second reference voltage 408 may be approximately 2.5 V. Other suitable reference voltages may be used. For example, the first reference voltage 404 and the second reference voltage 408 may be approximately equal. The use of approximately voltage thresholds that are derived from the same reference voltage, such as the second reference voltage 408, may decrease the number of mathematical calculations performed relative to the use of voltage thresholds derived from different reference voltages. The first reference voltage 404 and/or the second reference voltage 408 may be provided by an isolated supply as discussed further below with respect to FIG. 9.

A charge switch 412 and a discharge switch 416 are alternately switched such that one of the charge switch 412 and the discharge switch 416 is in a closed (conducting) state when the other one of the charge switch 412 and the discharge switch 416 is in an open (non-conducting) state. For example, the second reference voltage 408 charges a capacitor 420 via a pull-up resistor 424 when the charge switch 412 is in the closed state. When the charge switch 412 is in the closed state, the discharge switch 416 is in the open state. The second reference voltage 408 and the pull-up resistor form a pull-up circuit 426.

A voltage of the capacitor 420 increases during charging. The voltage of the capacitor 420 decreases during discharging. The voltage of the capacitor 420 is connected to a first input terminal of a comparator 428.

A selector 432 selects one of: a first voltage divider 436 and a second voltage divider 440. In various implementations, the first voltage divider 436 and the second voltage divider 440 may share one or more components. In the example of FIG. 5, resistors R115, R118, and R120 and capacitor C53 form one voltage divider (e.g., the second voltage divider 440), and resistors R115 and R120 and capacitor C53 form the other voltage divider (e.g., the first voltage divider 436).

When selected by the selector 432, the first voltage divider 436 converts the second reference voltage 408 into a first voltage threshold and applies the first voltage threshold to a second input terminal of the comparator 428. Similarly, the second voltage divider 440, when selected by the selector 432, converts the second reference voltage 408 into a second voltage threshold and applies the second voltage threshold to the second input terminal of the comparator 428.

The first voltage threshold is greater than the second voltage threshold. For example only, the first voltage divider 436 may be configured to generate the first voltage threshold at approximately 0.6*the second reference voltage 408. The second voltage divider 440 may be configured to generate the second voltage threshold at approximately 0.4*the second reference voltage 408.

The capacitor 420 is charged to the first voltage threshold during charging and discharged to the second voltage threshold during discharging. The comparator 428 compares the voltage of the capacitor 420 with the first voltage threshold during charging of the capacitor 420. When the voltage of the capacitor 420 becomes greater than the first voltage threshold, the comparator 428 transitions its output from a first state to a second state.

The output of the comparator 428 controls switching of an output switch 444. More specifically, the output of the comparator 428 is applied to a control terminal (e.g., gate terminal) of the output switch 444. When the output of the comparator 428 is in the second state, the output switch 444 is in an open state and creates an open circuit between its first terminal and ground. Ground may refer to a reference ground potential or an actual ground potential. When the output switch 444 is in the open state, a node 448 connected to the first terminal of the output switch 444 is connected to the first reference voltage 404 via a pull-up resistor 450.

The optocoupler 402 is connected to the node 448 and therefore generates an output based on the first reference voltage 404 when the output switch 444 is in the open state. The period that the optocoupler 402 generates its output based on the first reference voltage 404 corresponds to the period to discharge the capacitor 420 to the second voltage threshold.

Based on the first reference voltage 404 at the node 448, the charge switch 412 is in the open state (to prevent charging of the capacitor 420) and the discharge switch 416 is in the closed state (to discharge the capacitor 420). The selector 432 also selects the second voltage divider 440 based on voltage based on the first reference voltage 404 being present at the node 448.

When the comparator 428 transitions its output from the second state to the first state, the output switch 444 transitions from the open state to the closed state. When the output switch 444 is in the closed state, the output switch 444 connects its first terminal to its second terminal, thereby connecting the node 448 to ground.

The optocoupler 402 therefore generates the output based on ground when the output switch 444 is in the closed state. The output of the optocoupler 402 is therefore a PWM signal that transitions between a voltage based on the first reference voltage 404 and ground based on whether the capacitor is charging or discharging. The control module 220 determines the temperature of the thermistor 140 based on a duty cycle of the PWM signal. The period that the optocoupler 402 generates its output based on ground corresponds to the period to charge the capacitor 420 to the first voltage threshold, which is derived from the second reference voltage 408 using the second voltage divider 440.

Based on the node 448 being grounded, the charge switch 412 is in the closed state (to charge the capacitor 420) and the discharge switch 416 is in the closed state (to prevent discharging of the capacitor 420). The selector 432 also selects the first voltage divider 436 based on ground being present at the node 448. When the voltage of the capacitor 420 is less than the second voltage threshold, the comparator 428 transitions its output from the second state to the first state. This process of switching back and forth between charging and discharging the capacitor 420 continues.

The capacitor 420 discharges to the thermistor 140 and one or more other components of a discharge circuit 452 via the discharge switch 416. For example, the discharge circuit 452 may include one or more protection circuit components 456 and/or other circuit components. The protection circuit components 456 may, for example, limit the discharge period of the capacitor 420 to a predetermined maximum period, such as when the thermistor 140 is cold and the resistance of the thermistor 140 is therefore high in the example of the thermistor 140 being an NTC thermistor.

Figure 6:
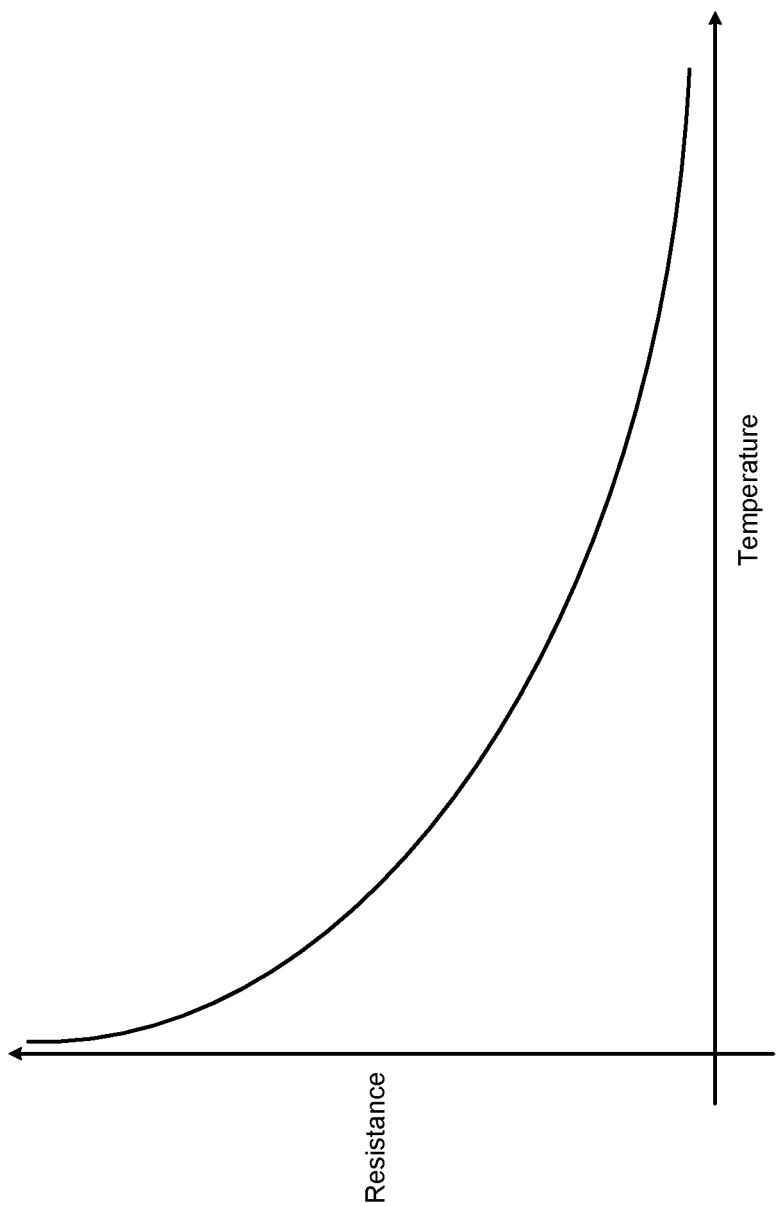
FIG. 6 is an example graph of resistance versus temperature of a thermistor.

The resistance of the thermistor 140 varies with temperature measured by the thermistor 140. For example only, the thermistor 140 may measure a DLT of the compressor 102 or another temperature of the system 100. FIG. 6 includes an example graph of thermistor resistance of an NTC thermistor as a function of temperature.

The control module 220 receives the signals from the optocoupler 402. The control module 220 measures the period between when the optocoupler 402 begins generating its output based on the node 448 being connected to the first reference voltage 404 and when the optocoupler 402 next begins generating its output based on the node 448 being connected to ground. This period is the discharge period of the capacitor 420. The control module 220 also measures the period between when the optocoupler 402 begins generating its output based on the node 448 being connected to ground and when the optocoupler 402 next begins generating its output based on the node 448 being connected to the first reference voltage 404. This period is the charging period of the capacitor 420.

A ratio of the charging period of the capacitor 420 to the discharge period of the capacitor 420 is equal to or approximately equal to a ratio of the resistance of the pull-up resistor 424 to the combined resistance of the thermistor 140 and other components of the discharge circuit 452. This equivalence is expressed by the equation below.

$$\frac{\text{Charging Period}}{\text{Discharge Period}} = \frac{R}{R(T\&OC)},$$

where Charging Period is the charging period of the capacitor 420, Discharge Period is the discharge period of the capacitor 420, R is the resistance of the pull-up resistor 424 through which the capacitor 420 is charged, and R(T&OC) represents the combined resistance determined based on the resistance of the thermistor 140 (T) and the resistance of the other components (OC) of the discharge circuit 452. This relationship is true for the use of voltage dividers that are balanced, such as the balance of the 0.4× and 0.6× the second reference voltage 408 (relative to 0.5× the second reference voltage 408) provided by the first and second voltage dividers 436 and 440. The present application, however, is also applicable to the use of non-balanced voltage thresholds. In the example of non-balanced voltage thresholds, the right side of the above relationship may be different (e.g., the numerator and denominator may be multiplied by constants) based on the voltage thresholds used.

The resistance of the other components of the discharge circuit 452 is a fixed predetermined resistance. The control module 220 determines the resistance of the thermistor 140 based on the charging period of the capacitor 420, the discharging period of the capacitor 420, and the predetermined resistance of the other components of the discharge circuit 452 by solving the relationship above for the resistance of the thermistor 140.

As stated above, the resistance of the thermistor 140 is related to the temperature measured by the thermistor 140. The control module 220 determines the temperature of the thermistor 140 based on the resistance of the thermistor 140. For example, the control module 220 may determine the temperature of the thermistor 140 using one of a function and a look-up table that relates resistances of the thermistor 140 to temperatures of the thermistor 140. In the example of using a look-up table, the control module 220 may determine the temperature of the thermistor 140 using interpolation (e.g., linear) when the resistance of the thermistor 140 is between entries of the look-up table.

The isolation circuit 260 may also include one or more cutoff switches, such as cutoff switch 460. Protection inputs, such as a low-pressure cutoff signal, a high pressure cutoff signal, and other protection signals may be applied to a control terminal of the cutoff switch 460. When a low-pressure cutoff, a high pressure cutoff, or another protection event is signaled, the cutoff switch 460 connects the node 448 to ground. This clamps the input to the optocoupler 402 to ground. The lack of a PWM like output from the optocoupler 402 may therefore indicate a problem, such as a lack of communication from the optocoupler 402 or a high pressure cutout.

In FIG. 5, a connector 504 connects with the thermistor 140. A connector 508 connects the protection inputs with two cutoff switches, both numbered 460. FIG. 5 also illustrates an example voltage converter 512 that converts the first reference voltage 404 into the second reference voltage 408. As shown in FIG. 5, a positive feedback circuit (e.g., including resistor R119 and capacitor C52) may be provided with the comparator 428. The positive feedback circuit may add hysteresis and prevent frequent and/or improperly timed transitions in the output of the comparator 428.

Figure 7:
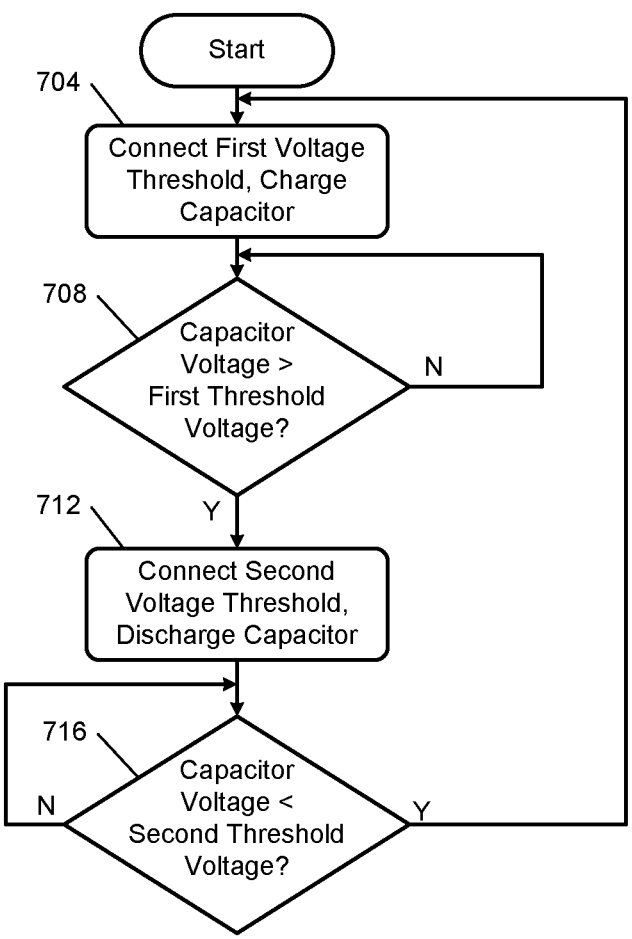
FIG. 7 is a flowchart depicting an example method of charging and discharging a capacitor for measuring a temperature across an isolation barrier using the thermistor.

FIG. 7 is a flowchart including an example method of controlling charging and discharging of the capacitor 420 for sensing a temperature measured using the thermistor 140. Control may begin with 704 where the first voltage threshold is connected to the comparator 428 and the charge switch 412 is operated in the closed state to charge the capacitor 420. Control continues with 708.

At 708, the comparator 428 determines whether the voltage of the capacitor 420 is greater than the first voltage threshold. If 708 is true, control continues with 712. If 708 is false, control remains at 708 and continues to charge the capacitor 420. At 712, the second voltage threshold is connected to the comparator 428. The charge switch 412 is operated in the open state, and the discharge switch 416 is operated in the closed state. The capacitor 420 therefore discharges to the thermistor 140 and other discharge circuit components. At 716, the comparator 428 determines whether the voltage of the capacitor 420 is less than the second voltage threshold. The second voltage threshold is less than the first voltage threshold. If 716 is true, control returns to 704. If 716 is false, control remains at 716 and continues to discharge the capacitor 420.

Control determines the resistance of the thermistor 140 based on the charging period, the discharge period of the capacitor 420, the resistance of the pull-up resistor 424, and the predetermined resistance of the other discharge circuit components. Control may determine the temperature measured by the thermistor 140 based on the resistance of the thermistor 140, based on the ratio of the charging period to the discharge period, or the PWM of the output signal of the isolation circuit 260.

Figure 8:
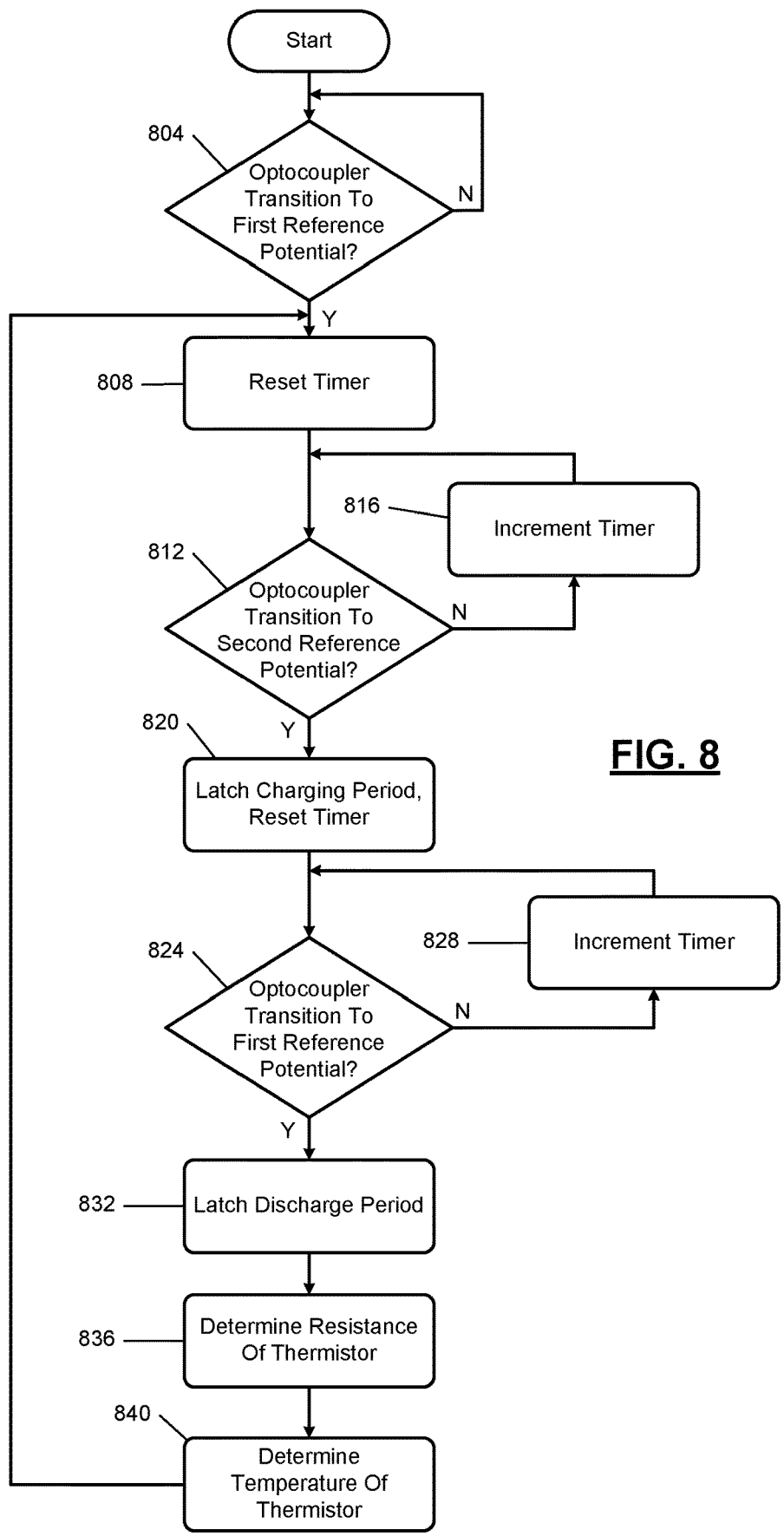
FIG. 8 is a flowchart depicting an example method of determining temperature measured using a resistor across an isolation barrier.

FIG. 8 includes a flowchart depicting an example method of determining the temperature measured by the thermistor 140. Control may begin with 804 where the control module 220 determines whether the output of the optocoupler 402 has transitioned from a second reference potential (e.g., ground) to a first reference potential (e.g., positive voltage). If 804 is true, the control module 220 may reset a timer at 808, and control continues with 812. If 804 is false, control may remain at 804. While the example of waiting at 804 for the output of the optocoupler 402 to transition is provided, control may instead continue with 812.

At 812, the control module 220 may determine whether the output of the optocoupler 402 has transitioned from the first reference potential to the second reference potential. If 812 is false, the control module 220 increments the timer at 816, and control returns to 812. If 812 is true, the control module 220 latches (or stores) the period tracked by the timer as the charging period of the capacitor 420 at 820 and may reset the timer at 820, and control continues with 824.

At 824, the control module 220 determines whether the output of the optocoupler 402 has transitioned from the second reference potential to the first reference potential. If 824 is false, the control module 220 increments the timer at 828, and control returns to 824. If 824 is true, control continues with 832. At 832, the control module 220 latches (or stores) the period tracked by the timer as the discharge period of the capacitor 420. Based on the charging period, the discharge period, the resistance of the pull-up resistor 424, and the predetermined resistance of the other circuit components, the control module 220 may determine the resistance of the thermistor 140 at 836. In various implementations, 836 may be omitted, and the temperature may be determined based on the ratio of the charging period to the discharge period (or the duty cycle of the output of the optocoupler 402). The control module 220 determines the temperature of the thermistor 140 at 840. For example, the control module 220 may determine the temperature of the thermistor 140 based on the resistance of the thermistor 140, the ratio of the charging period to the discharge period, or the duty cycle of the output of the optocoupler 402. While the example of continuing with 836 and 840 are provided, control may return to 808, and the control module 220 may perform 836 and 840 in parallel concurrently with waiting for a next transition.

Figure 9:
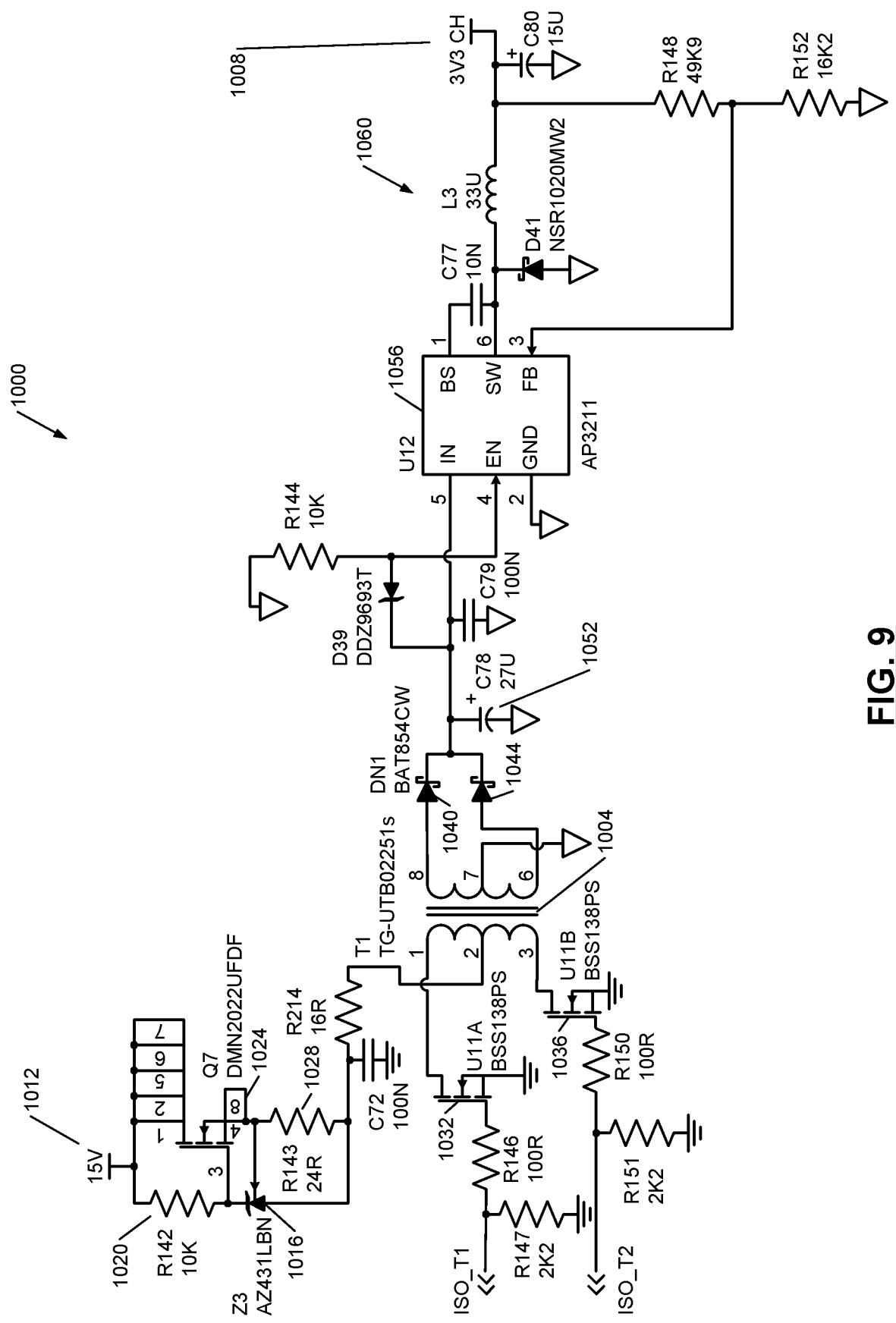
FIG. 9 is a circuit diagram of an example isolated supply.

In FIG. 9, a circuit diagram of an example an isolated supply 1000 is presented. A transformer 1004 provides galvanic isolation. Circuit elements to the left of the transformer 1004 in FIG. 9 are electrically connected to the control module 202, while circuit elements to the right of the transformer 1004 in FIG. 9 are electrically isolated.

The isolated supply 1000 creates the first reference voltage 404, for example the 3.3 Volt supply 1008. As discussed above, the first reference voltage 404 (e.g., the 3.3V supply 1008) is used by the isolation circuit 260. The first reference voltage 404 may also be used by one or more other circuits.

The isolated supply 1000 operates from a 15 Volt DC supply 1012. While the example of the DC supply 1012 being a 15 Volt supply is provided, the DC supply 1012 may supply another suitable voltage. A shunt regulator 1016 maintains a temperature-stable voltage across its terminals. A first resistor 1020 is connected in series between the shunt regulator 1016 and the 15 Volt DC supply 1012. The gate terminal of a switching transistor 1024 (such as an N-channel MOSFET) is connected to the node between the first resistor 1020 and the shunt regulator 1016.

As the current through the first resistor 1020 increases, the voltage drop across the first resistor 1020 increases, thereby pulling down the gate of the switching transistor 1024. A second resistor 1028 is connected between a source terminal of the switching transistor 1024 and the path of the terminal of the shunt regulator 1016. The arrangement of the switching transistor 1024 with the shunt regulator 1016 reduces current spikes that would otherwise be fed toward the transformer 1004.

In order to convert the 15 Volt DC supply 1012 into an alternating waveform that can couple across the transformer 1004, first and second switching devices 1032 and 1036 are alternately controlled to connect either end of a primary winding of the transformer 1004 to ground. With the center tap of the primary winding of the transformer 1004 connected to 15 Volts, a 15 Volt potential is reflected through the transformer 1004 to a pair of rectifier diodes 1040 and 1044.

The first and second switching devices 1032 and 1036 may be toggled by the control module 220. For example, the counter module 220 may include a counter that counts up to a certain integer at a certain frequency. When the counter reaches a predetermined number, one of the first and second switching devices 1032 and 1036 switches is enabled for a certain number of counts, then neither of the first and second switching devices 1032 and 1036 is enabled for a certain number of counts, then the other one of the first and second switching devices 1032 and 1036 is enabled for a certain number of counts.

For example, with a 36 Megahertz (MHz) clock on a counter, the first switching device 1032 may be turned on for the first 8 (eight) counts, neither of the first and second switching devices 1032 and 1036 is turned on for 1 count, then the second switching device 1036 is turned on for 8 counts, and then neither of the first and second switching devices 1032 and 1036 is turned on for 1 count. This dead time (of 1 count) when neither of the first and second switching devices 1032 and 1036 is turned on prevents both ends of the primary winding transformer 1004 from being pulled low at the same time.

This approximately 89 percent duty cycle (or looking at a single switch approximately 44-45 percent duty cycle) is repeated indefinitely by the control module 220 to create the alternating current that passes through the transformer 1004. Because each end of a secondary winding of the transformer 1004 is in turn raised to 15 Volts, the rectifier diodes 1040 and 1044 may be implemented as a pair of diodes as opposed to a bridge. The DC created by the rectifier diodes 1040 and 1044 is filtered by a capacitor 1052.

A buck converter 1056 converts the 15 Volt DC from the rectifier diodes 1040 and 1044 into the first reference voltage 404, the 3.3 Volt supply 1008. Circuit elements 1060 at the output of the buck converter 1056, including a 10 nanofarad capacitor, a diode, an inductor, a resistor divider, and a 15 microfarad capacitor may all be specified according to the datasheet of the buck converter 1056. The first reference voltage 408, such as the 3.3 Volt supply 1008, can then be used by isolated circuits, including the isolation circuit 260 discussed above.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An isolated temperature sensing system, comprising:
a thermistor that measures a temperature of a compressor system;
an isolation circuit that charges a capacitor, that sets an output signal to a first state during charging of the capacitor, that discharges the capacitor to the thermistor, and that sets the output signal to a second state during discharging of the capacitor to the thermistor,
wherein the first state is different than the second state, and
wherein the isolation circuit transitions from charging the capacitor to discharging the capacitor when a voltage of the capacitor is greater than a first voltage threshold; and
a control module that receives the output signal via an isolation barrier and that determines the temperature of the compressor system based on a ratio of: (i) a first period that the output signal is in the first state to (ii) a second period that the output signal is in the second state.

2. The isolated temperature sensing system of claim 1 wherein the temperature of the compressor system includes a discharge line temperature (DLT) of a compressor.

3. The isolated temperature sensing system of claim 1 further comprising the isolation barrier,
wherein the isolation barrier includes an optocoupler.

4. The isolated temperature sensing system of claim 1 wherein the isolation circuit charges the capacitor via a resistor and discharges the capacitor to the thermistor and at least one discharge circuit component.

5. The isolated temperature sensing system of claim 4 wherein the control module determines the temperature of the compressor system further based on a first resistance of the resistor and a second resistance of the at least one discharge circuit component.

6. The isolated temperature sensing system of claim 1 wherein the control module determines the temperature of the compressor system as a function of a duty cycle of the output signal.

7. The isolated temperature sensing system of claim 1 wherein the control module determines the temperature of the compressor system based on a duty cycle of the output signal using a look-up table that relates duty cycles to temperatures.

8. The isolated temperature sensing system of claim 1 wherein the control module determines a resistance of the thermistor based on the ratio and determines the temperature of the compressor system based on the resistance of the thermistor.

9. The isolated temperature sensing system of claim 1 wherein the isolation circuit transitions from discharging the capacitor to charging the capacitor when the voltage of the capacitor is less than a second voltage threshold,
wherein the second voltage threshold is less than the first voltage threshold.

10. The isolated temperature sensing system of claim 1 wherein the control module further controls the compressor system based on the temperature.

11. An isolated temperature sensing method, comprising:
by a thermistor, measuring a temperature of a compressor system;
by an isolation circuit, charging a capacitor, setting an output signal to a first state during charging of the capacitor, transitioning from charging the capacitor to discharging the capacitor when a voltage of the capacitor is greater than a first voltage threshold, discharging the capacitor to the thermistor, and setting the output signal to a second state during discharging of the capacitor to the thermistor, wherein the first state is different than the second state;

receiving the output signal via an isolation barrier; and determining the temperature of the compressor system based on a ratio of: (i) a first period that the output signal is in the first state to (ii) a second period that the output signal is in the second state.

12. The isolated temperature sensing method of claim 11 wherein the temperature of the compressor system includes a discharge line temperature (DLT) of a compressor.

13. The isolated temperature sensing method of claim 11 wherein the isolation barrier includes an optocoupler.

14. The isolated temperature sensing method of claim 11 wherein:

charging includes charging the capacitor via a resistor; and discharging includes discharging the capacitor to the thermistor and at least one discharge circuit component.

15. The isolated temperature sensing method of claim 14 wherein determining the temperature of the compressor system includes determining the temperature of the compressor system further based on a first resistance of the resistor and a second resistance of the at least one discharge circuit component.

16. The isolated temperature sensing method of claim 11 wherein determining the temperature of the compressor system includes determining the temperature of the compressor system as a function of a duty cycle of the output signal.

17. The isolated temperature sensing method of claim 11 wherein determining the temperature of the compressor system includes determining the temperature of the compressor system based on a duty cycle of the output signal using a look-up table that relates duty cycles to temperatures.

18. The isolated temperature sensing method of claim 11 further comprising determining a resistance of the thermistor based on the ratio, wherein determining the temperature of the compressor system includes determining the temperature of the compressor system based on the resistance of the thermistor.

19. The isolated temperature sensing method of claim 11 further comprising transitioning from discharging the capacitor to charging the capacitor when the voltage of the capacitor is less than a second voltage threshold, wherein the second voltage threshold is less than the first voltage threshold.

20. The isolated temperature sensing method of claim 11 further comprising controlling the compressor system based on the temperature.

* * * * *